(12) United States Patent
Zhang et al.

(10) Patent No.: US 10,797,901 B2
(45) Date of Patent: Oct. 6, 2020

(54) POWER ADJUSTMENT METHOD, NETWORK MANAGEMENT SYSTEM, CABLE MODEM TERMINATION SYSTEM, AND CABLE MODEM

(71) Applicant: Huawei Technologies Co., Ltd., Shenzhen (CN)

(72) Inventors: Xiaolong Zhang, Wuhan (CN); Tao Ouyang, Wuhan (CN); Fan Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 16/263,621

(22) Filed: Jan. 31, 2019

(65) Prior Publication Data
US 2019/0165965 A1 May 30, 2019

Related U.S. Application Data

(63) Continuation of application No. PCT/CN2016/093538, filed on Aug. 5, 2016.

(51) Int. Cl.
*H04N 7/173* (2011.01)
*H04L 12/28* (2006.01)
(Continued)

(52) U.S. Cl.
CPC ............ *H04L 12/2801* (2013.01); *H04B 3/32* (2013.01); *H04B 3/487* (2015.01); *H04B 17/336* (2015.01);
(Continued)

(58) Field of Classification Search
CPC ............ H04N 21/6118; H04N 21/6168; H04L 12/2801; H04L 5/14; H04B 17/336; H04B 3/487; H04B 3/32; H04W 72/0473
See application file for complete search history.

(56) References Cited

U.S. PATENT DOCUMENTS

| | | | |
|---|---|---|---|
| 6,877,166 B1 * | 4/2005 | Roeck | H04N 7/17309 348/E7.07 |
| 2002/0191684 A1 | 12/2002 | Min et al. | |

(Continued)

FOREIGN PATENT DOCUMENTS

| | | |
|---|---|---|
| CN | 1479979 A | 3/2004 |
| CN | 101299656 A | 11/2008 |

(Continued)

OTHER PUBLICATIONS

Sendonaris et al., "Joint Signaling Strategies for Approaching the Capacity of Twisted-Pair Channels," IEEE Transactions on Communications, vol. 46, No. 5, XP011009177, Institute of Electrical and Electronics Engineers, New York, New York (May 1, 1998).

(Continued)

*Primary Examiner* — Mulugeta Mengesha
(74) *Attorney, Agent, or Firm* — Leydig, Voit & Mayer, Ltd.

(57) ABSTRACT

The present invention provides a power adjustment method, a network management system, a CMTS, and a CM. The power adjustment method includes: obtaining, by a network management system, a first $SNR_{CM}$ between two CMs connected to a CMTS, where the first $SNR_{CM}$ represents a signal ratio of a signal sent by the CMTS to a first CM and received by the first CM to a signal sent by a second CM to the CMTS and received by the first CM; and sending, by the network management system, indication information to the CMTS based on the first $SNR_{CM}$, and a first relationship between an $SNR_{CM}$ and a transmit power at which the CMTS sends a signal to the CM.

11 Claims, 5 Drawing Sheets

(51) Int. Cl.
*H04B 3/487* (2015.01)
*H04B 3/32* (2006.01)
*H04L 5/14* (2006.01)
*H04B 17/336* (2015.01)
*H04N 21/61* (2011.01)
*H04W 72/04* (2009.01)
*H04B 1/525* (2015.01)

(52) U.S. Cl.
CPC ........... *H04L 5/14* (2013.01); *H04N 21/6118* (2013.01); *H04N 21/6168* (2013.01); *H04W 72/0473* (2013.01); *H04B 1/525* (2013.01)

(56) References Cited

U.S. PATENT DOCUMENTS

| | | | |
|---|---|---|---|
| 2005/0122996 A1* | 6/2005 | Azenkot | H04L 41/0816 370/477 |
| 2008/0101210 A1* | 5/2008 | Thompson | H04L 1/0003 370/204 |
| 2009/0296794 A1* | 12/2009 | Min | H04L 25/03343 375/222 |
| 2010/0158093 A1 | 6/2010 | Thompson et al. | |
| 2014/0022926 A1 | 1/2014 | Ling et al. | |
| 2014/0022943 A1 | 1/2014 | Ling et al. | |
| 2014/0328190 A1 | 11/2014 | Lord et al. | |
| 2016/0174163 A1* | 6/2016 | Emmanuel | H04B 17/345 370/329 |
| 2016/0344589 A1* | 11/2016 | Ling | H04L 43/12 |
| 2018/0041970 A1 | 2/2018 | Emmanuel et al. | |

FOREIGN PATENT DOCUMENTS

| | | |
|---|---|---|
| CN | 202872827 U | 4/2013 |
| CN | 105704823 A | 6/2016 |
| WO | 0235906 A2 | 5/2002 |

OTHER PUBLICATIONS

"Data-Over-Cable Service Interface Specifications DOCSIS® 3.1, Physical Layer Specification," CM-SP-PHYv3.1-I07-150910, Cable Television Laboratories, Inc., pp. 1-244 (Sep. 10, 2015).

"Data-Over-Cable Service Interface Specifications DOCSIS® 3.1, MAC and Upper Layer Protocols Interface Specification," CM-SP-MULPIv3.1-I07-150910, Cable Television Laboratories, Inc., pp. 1-816 (Sep. 10, 2015).

* cited by examiner

POWER ADJUSTMENT METHOD, NETWORK MANAGEMENT SYSTEM, CABLE MODEM TERMINATION SYSTEM, AND CABLE MODEM

CROSS-REFERENCE TO RELATED APPLICATIONS

This application is a continuation of International Application No. PCT/CN2016/093538, filed on Aug. 5, 2016, the disclosure of which is hereby incorporated by reference in its entirety.

TECHNICAL FIELD

The present invention relates to the field of communications, and in particular, to a power adjustment method, a network management system, a cable modem termination system (CMTS), and a cable modem (CM).

BACKGROUND

In the communications field, time division duplex (TDD), frequency division duplex (FDD), and co-time co-frequency full duplex (CCFD) are mainly included.

In a current CCFD solution, CCFD is implemented only on a CMTS side, and on a CM side, all CMs may be grouped based on an interference relationship (also referred to as isolation) between CMs. Specifically, CMs that interfere with each other or have mutual interference that does not meet a requirement are put into one group to implement FDD within a CM group, and CMs that do not interfere with each other or have mutual interference that meets a requirement are put into different groups. CCFD is implemented between groups to improve spectral efficiency.

It may be learned from the foregoing content that CM grouping is mainly implemented based on an interference relationship between CMs. In other words, the interference relationship between the CMs can determine grouping of the CMs. Specifically, adjusting the interference relationship between the CMs may change the CM grouping. How to adjust the interference relationship between the CMs to group the CMs as required becomes a problem to be resolved.

SUMMARY

The present invention provides a power adjustment method, a network management system, a CMTS, and a CM, to adjust a power of the CMTS based on a co-channel mutual interference signal-to-noise ratio between CMs, and a relationship between the co-channel mutual interference signal-to-noise ratio and the power, so that the co-channel mutual interference signal-to-noise ratio between the CMs can be flexibly changed, and further the CMs can be flexibly grouped.

According to a first aspect, the present invention provides a power adjustment method, including: obtaining, by a network management system, a first $SNR_{CM}$ between two CMs connected to a CMTS, where the first $SNR_{CM}$ represents a signal ratio of a signal sent by the CMTS to a first CM and received by the first CM to a signal sent by a second CM to the CMTS and received by the first CM; and sending, by the network management system, indication information to the CMTS based on the first $SNR_{CM}$, and a first relationship between an $SNR_{CM}$ and a transmit power at which the CMTS sends a signal to the CM, where the indication information is used to instruct the CMTS to adjust a transmit power at which the CMTS sends the signal to the first CM, so that an $SNR_{CM}$ corresponding to the adjusted transmit power is a target value of a co-channel mutual interference signal-to-noise ratio between the two CMs.

In this embodiment of the present invention, the network management system determines, based on the obtained co-channel mutual interference signal-to-noise ratio between the CMs, and a relationship between the co-channel mutual interference signal-to-noise ratio and the transmit power at which the CMTS sends the signal to the CM, how the CMTS should adjust the transmit power at which the CMTS sends the signal to the CM; and sends indication information to the CMTS, to instruct the CMTS to adjust the transmit power at which the CMTS sends the signal to the CM, so that when the CMTS sends the signal to the CM at the adjusted transmit power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the transmit power, and flexibly group the CMs.

In a possible implementation, the method further includes: obtaining, by the network management system, a first co-channel self-interference cancellation capability signal-to-noise ratio $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM; and sending, by the network management system, the indication information to the CMTS based on the first $SNR_{CMTS}$, and a second relationship between an $SNR_{CMTS}$ and the transmit power at which the CMTS sends the signal to the CM, where the indication information is used to instruct the CMTS to adjust the transmit power at which the CMTS sends the signal to the first CM, so that an $SNR_{CMTS}$ corresponding to the adjusted transmit power is greater than or equal to a co-channel self-interference cancellation capability signal-to-noise ratio threshold.

In this embodiment of the present invention, the network management system further obtains the $SNR_{CMTS}$ of the CMTS, and sends, to the CMTS based on the $SNR_{CM}$ between the CMs, the $SNR_{CMTS}$ of the CMTS, the relationship between the $SNR_{CM}$ and the transmit power at which the CMTS sends the signal to the CM, and the relationship between the $SNR_{CMTS}$ of the CMTS and the transmit power, the indication information instructing the CMTS to adjust the transmit power, so that the $SNR_{CM}$ when the CMTS sends the signal to the CM at the adjusted transmit power is greater than or equal to a co-channel mutual interference signal-to-noise ratio threshold, and the $SNR_{CMTS}$ is greater than or equal to the co-channel self-interference cancellation capability signal-to-noise ratio threshold.

In a possible implementation, the indication information carries a first target transmit power at which the CMTS sends the signal to the first CM, and the indication information is specifically used to instruct the CMTS to adjust the transmit power at which the CMTS sends the signal to the first CM to the first target transmit power.

In this embodiment of the present invention, the network management system may directly send, to the CMTS, a target adjusted value of the transmit power at which the CMTS sends the signal to the CM. Optionally, the network management system may send, to the CMTS, an adjustment amount by which the transmit power needs to be adjusted.

In a possible implementation, the first target transmit power is different from a target transmit power at which the CMTS sends a signal to another CM.

In this embodiment of the present invention, the network management system may instruct the CMTS to adjust a transmit power at which the CMTS sends a signal to a CM to be different from a target transmit power at which the CMTS sends a signal to another CM, thereby more flexibly instructing the CMTS to adjust the transmit power.

According to a second aspect, the present invention provides a power adjustment method, including: receiving, by a CMTS, indication information sent by a network management system; and adjusting, by the CMTS based on the indication information, a transmit power at which the CMTS sends a signal to a first cable modem CM, so that an $SNR_{CM}$ corresponding to the adjusted transmit power is a target value of a co-channel mutual interference signal-to-noise ratio, where the $SNR_{CM}$ represents a signal ratio of a signal sent by the CMTS to the first CM and received by the first CM to a signal sent by a second CM to the CMTS and received by the first CM.

In this embodiment of the present invention, after receiving the indication information that instructs the CMTS to adjust the transmit power at which the CMTS sends the signal to the CM and that is sent by the network management system, the CMTS may adjust the transmit power based on the indication information, so that an $SNR_{CM}$ between the CMs when the CMTS sends the signal to the CM at the adjusted transmit power is greater than or equal to a co-channel mutual interference signal-to-noise ratio threshold. In other words, the CMTS can flexibly adjust the $SNR_{CM}$ between the CMs by adjusting the transmit power, so that the CMs can be flexibly grouped.

In a possible implementation, the adjusting, by the CMTS based on the indication information, a transmit power at which the CMTS sends a signal to a first cable modem CM, so that an $SNR_{CM}$ corresponding to the adjusted transmit power is a target value of a co-channel mutual interference signal-to-noise ratio includes: adjusting, by the CMTS based on the indication information, the transmit power at which the CMTS sends the signal to the first CM, so that the $SNR_{CM}$ corresponding to the adjusted transmit power is the target value of the co-channel mutual interference signal-to-noise ratio, and an $SNR_{CMTS}$ corresponding to the adjusted transmit power is greater than or equal to a co-channel self-interference cancellation capability signal-to-noise ratio threshold, where the $SNR_{CMTS}$ represents a signal ratio of a signal sent by the second CM and received by the CMTS to a signal that remains after self-interference cancellation is performed on a signal that is received by the CMTS and sent by the CMTS to the first CM.

In this embodiment of the present invention, when adjusting the transmit power at which the CMTS sends the signal to the CM, the CMTS may make the $SNR_{CMTS}$ corresponding to the adjusted transmit power greater than or equal to the co-channel self-interference cancellation capability signal-to-noise ratio threshold. In other words, the adjusted transmit power can ensure that the $SNR_{CMTS}$ of the CMTS meets a requirement.

In a possible implementation, the indication information carries a first target transmit power at which the CMTS sends the signal to the first CM; and the adjusting, by the CMTS based on the indication information, the transmit power at which the CMTS sends the signal to the first CM includes: adjusting, by the CMTS, the transmit power at which the CMTS sends the signal to the first CM to the first target transmit power.

In this embodiment of the present invention, the CMTS may directly adjust the transmit power to a target transmit power based on the target transmit power indicated in the indication information.

In a possible implementation, the first target transmit power is different from a target transmit power at which the CMTS sends a signal to another CM.

In this embodiment of the present invention, a target transmit power adjusted by the CMTS may be different from the target transmit power at which the CMTS sends the signal to the another CM, so that the CMTS can be instructed more flexibly to adjust the transmit power.

According to a third aspect, the present invention provides a power adjustment method, including: obtaining, by a network management system, a first $SNR_{CM}$ between CMs connected to a CMTS, where the first $SNR_{CM}$ represents a signal ratio of a signal sent by the CMTS to a first CM and received by the first CM to a signal sent by a second CM to the CMTS and received by the first CM; and sending, by the network management system, indication information to the CMTS based on the first $SNR_{CM}$, and a first relationship between an $SNR_{CM}$ and a receive power at which the CMTS receives a signal sent by the CM, where the indication information is used to instruct the CMTS to adjust the receive power at which the CMTS receives the signal sent by the second CM, so that an $SNR_{CM}$ corresponding to the adjusted receive power is a target value of a co-channel mutual interference signal-to-noise ratio.

In this embodiment of the present invention, the network management system determines, based on the obtained co-channel mutual interference signal-to-noise ratio between the CMs, and a relationship between the co-channel mutual interference signal-to-noise ratio and the receive power at which the CMTS receives the signal sent by the CM, how the CMTS should adjust the receive power at which the CMTS receives the signal sent by the CM; and sends indication information to the CMTS, to instruct the CMTS to adjust the receive power at which the CMTS receives the signal sent by the CM, so that when the CMTS receives the signal sent by the CM at the adjusted receive power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the receive power, and flexibly group the CMs.

In a possible implementation, the method further includes: obtaining, by the network management system, a first $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM; and sending, by the network management system, the indication information to the CMTS based on the first $SNR_{CMTS}$, and a second relationship between an $SNR_{CMTS}$ and the receive power at which the CMTS receives the signal sent by the CM, where the indication information is used to instruct the CMTS to adjust the receive power at which the CMTS receives the signal sent by the second CM, so that an $SNR_{CMTS}$ corresponding to the adjusted receive power is greater than or equal to a co-channel self-interference cancellation capability signal-to-noise ratio threshold.

In this embodiment of the present invention, the network management system further obtains the $SNR_{CMTS}$ of the CMTS, and sends, to the CMTS based on the $SNR_{CM}$ between the CMs, the $SNR_{CMTS}$ of the CMTS, the relationship between the $SNR_{CM}$ and the receive power at which the CMTS receives the signal sent by the CM, and the relationship between the $SNR_{CMTS}$ of the CMTS and the receive power, the indication information instructing the CMTS to adjust the transmit power, so that the $SNR_{CM}$ when the CMTS receives the signal sent by the CM at the adjusted receive power is greater than or equal to a co-channel mutual interference signal-to-noise ratio threshold, and the $SNR_{CMTS}$ is greater than or equal to the co-channel self-interference cancellation capability signal-to-noise ratio threshold.

In a possible implementation, the indication information carries a first target receive power at which the CMTS receives the signal sent by the second CM, and the indication information is specifically used to instruct the CMTS to adjust the receive power at which the CMTS receives the signal sent by the second CM to the first target receive power.

In this embodiment of the present invention, the network management system may directly send, to the CMTS, a target adjusted value of the receive power at which the CMTS receives the signal sent by the CM. Optionally, the network management system may send, to the CMTS, an adjustment amount by which the receive power needs to be adjusted.

In a possible implementation, the first target receive power is different from a target receive power at which the CMTS receives a signal sent by another CM.

In this embodiment of the present invention, the network management system may instruct the CMTS to adjust a receive power at which the CMTS receives a signal sent by a CM to be different from a target receive power at which the CMTS receives a signal sent by another CM, so that the CMTS can be flexibly instructed to adjust the receive power.

According to a fourth aspect, the present invention provides a power adjustment method, including: receiving, by a CMTS, indication information sent by a network management system; and adjusting, by the CMTS based on the indication information, a receive power at which the CMTS receives a signal sent by a first cable modem CM, so that an $SNR_{CM}$ corresponding to the adjusted receive power is a target value of a co-channel mutual interference signal-to-noise ratio, where the $SNR_{CM}$ represents a signal ratio of a signal sent by the CMTS to a second CM and received by the second CM to a signal sent by the first CM to the CMTS and received by the second CM.

In this embodiment of the present invention, after receiving indication information that instructs the CMTS to adjust the receive power at which the CMTS receives the signal sent by the CM and that is sent by the network management system, the CMTS may adjust the receive power based on the indication information, so that an $SNR_{CM}$ between the CMs when the CMTS receives the signal sent by the CM at the adjusted receive power is greater than or equal to a co-channel mutual interference signal-to-noise ratio threshold. In other words, the CMTS can flexibly adjust the $SNR_{CM}$ between the CMs by adjusting the receive power, so that the CMs can be flexibly grouped.

In a possible implementation, the adjusting, by the CMTS based on the indication information, a receive power at which the CMTS receives a signal sent by a first CM, so that an $SNR_{CM}$ corresponding to the adjusted receive power is a target value of a co-channel mutual interference signal-to-noise ratio includes: adjusting, by the CMTS based on the indication information, the receive power at which the CMTS receives the signal sent by the first CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold, where the $SNR_{CMTS}$ represents a signal ratio of the signal sent by the first CM and received by the CMTS to a signal that remains after self-interference cancellation is performed on the signal that is received by the CMTS and sent by the CMTS to the second CM.

In this embodiment of the present invention, when adjusting the transmit power at which the CMTS sends the signal to the CM, the CMTS may make the $SNR_{CMTS}$ corresponding to the adjusted transmit power greater than or equal to the co-channel self-interference cancellation capability signal-to-noise ratio threshold. In other words, the adjusted transmit power can ensure that the $SNR_{CMTS}$ of the CMTS meets a requirement.

In a possible implementation, the indication information carries a first target receive power at which the CMTS receives the signal sent by the first CM; and the adjusting, by the CMTS based on the indication information, the receive power at which the CMTS receives the signal sent by the first CM includes: adjusting, by the CMTS, the receive power at which the CMTS receives the signal sent by the first CM to the first target receive power.

In this embodiment of the present invention, the CMTS may directly adjust the transmit power to a target transmit power based on the target transmit power indicated in the indication information.

In a possible implementation, the first target receive power is different from a target receive power at which the CMTS receives a signal sent by another CM.

In this embodiment of the present invention, a target receive power adjusted by the CMTS may be different from the target transmit power at which the CMTS sends the signal to the another CM, so that the CMTS can be instructed more flexibly to adjust the transmit power.

In a possible implementation, the method further includes: measuring, by the CMTS, a first receive power at which the CMTS actually receives the signal sent by the first CM; determining, by the CMTS based on the first receive power and the first target receive power, an adjustment value of a transmit power at which the first CM sends the signal to the CMTS; and sending, by the CMTS to the first CM, a message carrying the adjustment value, so that the first CM adjusts, based on the adjustment value, the transmit power at which the first CM sends the signal to the CMTS.

In this embodiment of the present invention, when target receive powers at which the CMTS receives signals sent by different CMs are different, the CMTS may instruct, based on receive powers at which the CMTS actually receives the signals sent by the different CMs and the adjusted target receive powers, the different CMs to adjust transmit powers at which the CMs send the signals to the CMTS, so that when the CM sends the signal to the CMTS at the adjusted transmit power, a receive power of the CMTS is the target receive power.

In a possible implementation, the determining, by the CMTS based on the first receive power and the first target receive power, an adjustment value of a transmit power at which the first CM sends the signal to the CMTS includes: subtracting, by the CMTS, the first receive power from the first target receive power, to obtain the adjustment value.

In a possible implementation, the method further includes: measuring, by the CMTS, a second receive power at which the CMTS actually receives the signal sent by the first CM; obtaining, by the CMTS, an average expected receive power and a compensated receive power, where the average expected receive power is a same expected target receive power at which the CMTS receives signals sent by the first CM and the another CM, and the compensated receive power is a power needing to be compensated for adjusting the average expected receive power to the first target receive power; determining, by the CMTS based on the second receive power, the average expected receive power, and the compensated receive power, an adjustment value of a transmit power at which the first CM sends the signal to the CMTS; and sending, by the CMTS to the first CM, a message carrying the adjustment value, so that the first CM adjusts, based on the adjustment value, the transmit power at which the first CM sends the signal to the CMTS.

In this embodiment of the present invention, when target receive powers at which the CMTS receives signals sent by different CMs are different, the CMTS may instruct, based on receive powers at which the CMTS actually receives the signals sent by the different CMs, the average expected receive power, and the compensated receive powers, the different CMs to adjust transmit powers at which the CMs send the signals to the CMTS, so that when the CM sends the signal to the CMTS at the adjusted transmit power, a receive power of the CMTS is the target receive power.

In a possible implementation, the determining, by the CMTS based on the second receive power, the average expected receive power, and the compensated receive power, an adjustment value of a transmit power at which the first CM sends the signal to the CMTS includes: performing, by the CMTS, calculation of: Average expected receive power−First receive power+Compensated receive power, to obtain the adjustment value.

In a possible implementation, the method further includes: performing, by the CMTS, calculation of: Average expected receive power−First receive power, to obtain the adjustment value.

According to a fifth aspect, the present invention provides a power adjustment method, including: receiving, by a CM, indication information sent by a CMTS; and adjusting, by the CM based on the indication information, a transmit power at which the CM sends a signal to the CMTS, so that a receive power at which the CMTS receives the signal that is sent by the CM at the transmit power is a first target receive power, where the first target receive power is different from a target receive power at which the CMTS receives a signal sent by another CM.

In this embodiment of the present invention, when target receive powers at which the CMTS receives signals sent by different CMs are different, each CM may adjust, based on indication information of the CMTS, a transmit power at which the CM sends the signal to the CMTS, so that when the CM sends the signal to the CMTS at the adjusted transmit power, a receive power of the CMTS is the target receive power.

According to a sixth aspect, the present invention provides a network management system, where the network management system includes a module configured to perform the power adjustment method in the first aspect.

According to a seventh aspect, the present invention provides a CMTS, where the CMTS includes a module configured to perform the power adjustment method in the second aspect.

According to an eighth aspect, the present invention provides a network management system, where the network management system includes a module configured to perform the power adjustment method in the third aspect.

According to a ninth aspect, the present invention provides a CMTS, where the CMTS includes a module configured to perform the power adjustment method in the fourth aspect.

According to a tenth aspect, the present invention provides a CM, where the CM includes a module configured to perform the power adjustment method in the fifth aspect.

According to an eleventh aspect, the present invention provides a network management system, including a processor, a memory, a receiver, and a transmitter, where the memory is configured to store code, and the processor is configured to execute the code in the memory. When the code is executed, the processor invokes the receiver and the transmitter to implement the method in the first aspect.

According to a twelfth aspect, the present invention provides a CMTS, including a processor, a memory, a receiver, and a transmitter, where the memory is configured to store code, and the processor is configured to execute the code in the memory. When the code is executed, the processor invokes the receiver and the transmitter to implement the power adjustment method in the second aspect.

According to a thirteenth aspect, the present invention provides a network management system, including a processor, a memory, a receiver, and a transmitter, where the memory is configured to store code, and the processor is configured to execute the code in the memory. When the code is executed, the processor invokes the receiver and the transmitter to implement the power adjustment method in the third aspect.

According to a fourteenth aspect, the present invention provides a CMTS, including a processor, a memory, a receiver, and a transmitter, where the memory is configured to store code, and the processor is configured to execute the code in the memory. When the code is executed, the processor invokes the receiver and the transmitter to implement the power adjustment method in the fourth aspect.

According to a fifteenth aspect, the present invention provides a CM, including a processor, a memory, a receiver, and a transmitter, where the memory is configured to store code, and the processor is configured to execute the code in the memory. When the code is executed, the processor invokes the receiver and the transmitter to implement the power adjustment method in the fifth aspect.

According to a sixteenth aspect, the present invention provides a computer readable medium, where the computer readable medium is configured to store program code executed by a network management system, and the program code includes an instruction used to perform the method in the first aspect.

According to a seventeenth aspect, the present invention provides a computer readable medium, where the computer readable medium is configured to store program code executed by a CMTS, and the program code includes an instruction used to perform the method in the second aspect.

According to an eighteenth aspect, the present invention provides a computer readable medium, where the computer readable medium is configured to store program code executed by a CM, and the program code includes an instruction used to perform the method in the third aspect.

According to a nineteenth aspect, the present invention provides a computer readable medium, where the computer readable medium is configured to store program code executed by a CMTS, and the program code includes an instruction used to perform the method in the fourth aspect.

According to a twentieth aspect, the present invention provides a computer readable medium, where the computer readable medium is configured to store program code executed by a CMTS, and the program code includes an instruction used to perform the method in the fifth aspect.

According to a twenty-first aspect, the present invention provides a cable communications system, including the network management system in the sixth aspect or any possible implementation of the sixth aspect, and the CMTS in the seventh aspect or any possible implementation of the seventh aspect.

According to a twenty-second aspect, the present invention provides a cable communications system, including the network management system in the eighth aspect or any possible implementation of the eighth aspect, the CMTS in the ninth aspect or any possible implementation of the ninth aspect, and the CM in the eleventh aspect or any possible implementation of the eleventh aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding, first, an overall description is given to a schematic diagram of a system architecture of a cable communications system that can implement a power adjustment method in the embodiments of the present invention. It should be understood that, the embodiments of the present invention are not limited to a system architecture shown in FIG. 1. In addition, an apparatus in FIG. 1 may be hardware, or software classified by function, or a combination thereof.

Figure 1:
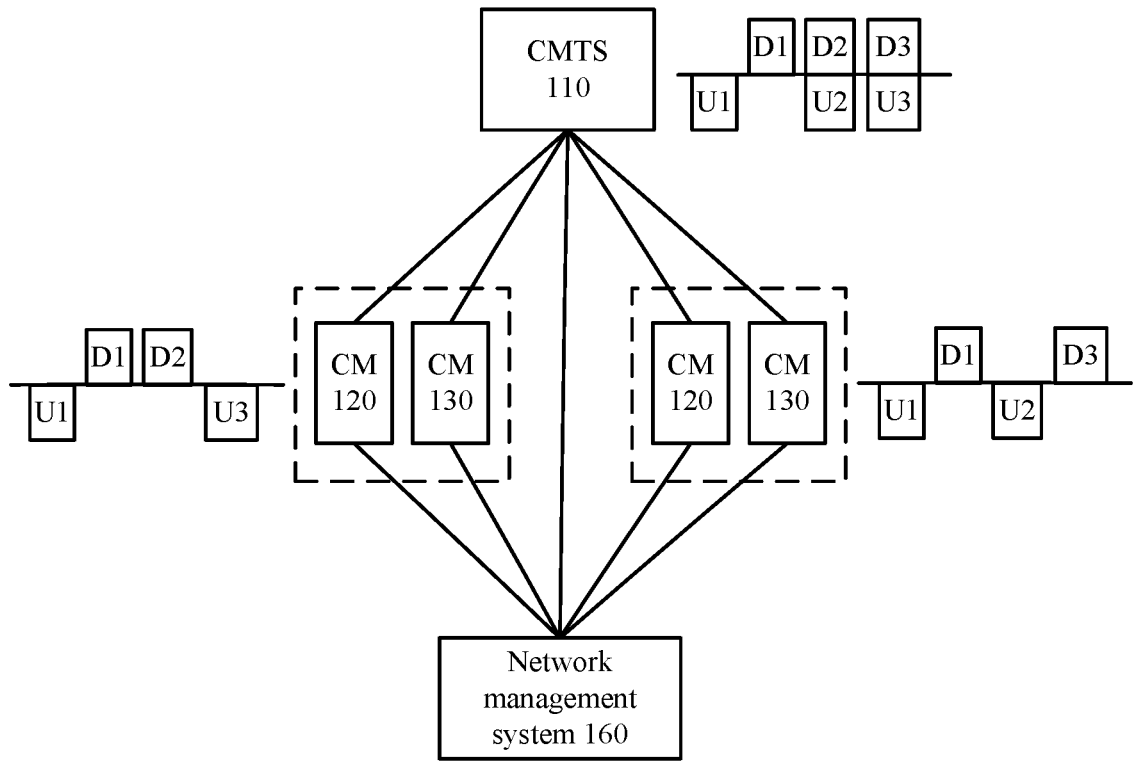
FIG. 1 is a schematic architectural diagram of a communications system according to an embodiment of the present invention.

The system shown in FIG. 1 includes a CMTS 110, a CM 120, a CM 130, a CM 140, a CM 150, and a network management system 160. It should be noted that a quantity of CMTSs and a quantity of CMs in FIG. 1 should not be construed as any limitation to the present invention. The CMTS 110, the CM 120, the CM 130, the CM 140, and the CM 150 may comply with the conventional data over cable service interface specification (DOCSIS) 3.1.

The CMTS is a device for managing and controlling the CM. Configuration of the CMTS may be completed by using a console interface or an Ethernet interface, and configuration content mainly includes: a downlink frequency, a downlink modulation method, a downlink level, and the like. The downlink frequency can be set to any value in a specified frequency range. However, to avoid interference to a signal of another channel, the downlink frequency should be selected from specified frequencies with reference to a cable television channel division table. A modulation method should be selected in consideration of channel transmission quality. In addition, Internet Protocol (IP) addresses of Dynamic Host Configuration Protocol (DHCP) and Trivial File Transfer Protocol (TFTP) servers, an IP address of a CMTS, and the like need to be configured. After the foregoing settings are complete, if an intermediate line is not faulty and attenuation of a signal level meets a requirement, the DHCP and TFTP servers are started. In this way, a normal communication channel can be established between a front end and the CM.

The CM is a device that is on a cable television network (namely, a cable network) and that is used to connect to the Internet. The CM is connected in series between a cable television cable socket in a user's home and an Internet access device. The other end connected to the CM by using the cable television network is on a cable television station, and the other end may be referred to as a front end or a head-end.

The network management system is a software-based network application system that combines software and hardware. An objective of the network management system is to manage a network, to make the network run efficiently and normally. The network management system may perform parameter configuration and performance monitoring for devices in the network, such as the CMTS and the CM, and may further perform fault management, security management, account management, and the like. The network management system may communicate with a device such as the CMTS or the CM by using a protocol such as the Simple Network Management Protocol (SNMP) or the Trivial File Transfer Protocol (TFTP), so that parameter configurations and parameters of devices such as the CMTS and the CM can be collected.

An operation mode of the CMTS 110 is CCFD. As shown in FIG. 1, the CMTS 110 may separately use channels occupying a D1 spectrum, a D2 spectrum, and a D3 spectrum to send downlink signals, and may also receive uplink signals sent by using channels occupying a U1 spectrum, a U2 spectrum, and a U3 spectrum. The D2 spectrum totally overlaps the U2 spectrum, and the D3 spectrum totally overlaps the U3 spectrum. The CMTS may send signals to all CMs at same or different powers. The CMTS may receive, at same or different powers, signals that are sent by the CMs.

The CM 120, the CM 130, the CM 140, and the CM 150 retain uplink and downlink frequency division duplex, namely, FDD. The CM 120, the CM 130, the CM 140, and the CM 150 need to be grouped based on a magnitude of mutual isolation (which may also be referred to as interference severity). For example, the CM 120 and the CM 130 are in a same group, and the CM 120 and the CM 130 may use channels occupying the U1 spectrum and the U3 spectrum to send uplink signals, and may receive downlink signals sent by using channels occupying the D1 spectrum and the D2 spectrum. The U1 spectrum, the U3 spectrum, the D1 spectrum, and the D2 spectrum do not overlap each other.

The CM 140 and the CM 150 are in a same group, and the CM 140 and the CM 150 may use channels occupying the U1 spectrum and the U2 spectrum to send uplink signals, and may receive downlink signals sent by using channels occupying the D1 spectrum and the D3 spectrum. The U1 spectrum, the U2 spectrum, the D1 spectrum, and the D3 spectrum do not overlap each other.

In this embodiment of the present invention, mutual isolation between any two CMs, for example, two of M CMs connected to the CMTS, may also be represented by a co-channel mutual interference signal-to-noise ratio $SNR_{CM}$. SNR is an English acronym of signal-to-noise ratio.

The $SNR_{CM}$ may be a degree of interference to a signal sent by the CMTS and received by one (which is referred to as a first CM for ease of subsequent description) of the M CMs from a signal sent by another CM (which is referred to as a second CM for ease of subsequent description) and received by the first CM. Specifically, the signal sent by the CMTS and received by the first CM is used as a wanted signal, the signal sent by the second CM and received by the first CM is used as noise, and a ratio of the wanted signal to the noise is the $SNR_{CM}$ of the second CM to the first CM.

More specifically, the $SNR_{CM}$ may further indicate a relationship between a power at which the first CM receives a signal sent by the CMTS when the signal arrives at the first CM and a power at which the first CM receives a signal sent by the second CM when the signal arrives at the first CM. For example, $SNR_{CM}=SNR_{topology}-(PR-PT)$, where PR is a receive power at which the CMTS receives the signal sent by the second CM, PT is a transmit power at which the CMTS sends the signal to the first CM, and $SNR_{topology}$ is determined by a common uplink path and a branch distributor at an uplink intersection of the second CM and the first CM.

After a network is deployed, $SNR_{topology}$ is determined. $SNR_{topology}$ in a deployed network is a fixed value. It can be learned that, when PR or PT or both change, $SNR_{CM}$ changes accordingly. Therefore, the $SNR_{CM}$ between the two CMs may be changed by changing PR and/or PT. In other words, when the $SNR_{CM}$ between the two CMs needs to be changed from $SNR1_{CM}$ to $SNR2_{CM}$, PR or PT may be adjusted by a value of $(SNR2_{CM}-SNR1_{CM})$, or both PR and PT may be adjusted while ensuring that a difference between (PR−PT) obtained after the adjustment and (PR−PT) obtained before the adjustment is $-(SNR2_{CM}-SNR1_{CM})$.

For example, the $SNR_{CM}$ between the two CMs is currently 40 dB. If the $SNR_{CM}$ between the two CMs needs to be adjusted to 45 dB, PT may be increased by 5 dB, or PR may be decreased by 5 dB, or both PR and PT may be adjusted, provided that (PR1−PT1)−(PR2−PT2)=5 dB, where PT1 and PR1 are unadjusted PT and unadjusted PR, and PT2 and PR2 are adjusted PT and adjusted PR.

It should be noted that, in this embodiment of the present invention, sending a signal by the CMTS or the CM and receiving a signal by the CMTS or the CM both occur in a same frequency spectrum (the frequency spectrum may be referred to as a first frequency band), or in a same channel (the channel may be referred to as a first channel).

Figure 2:
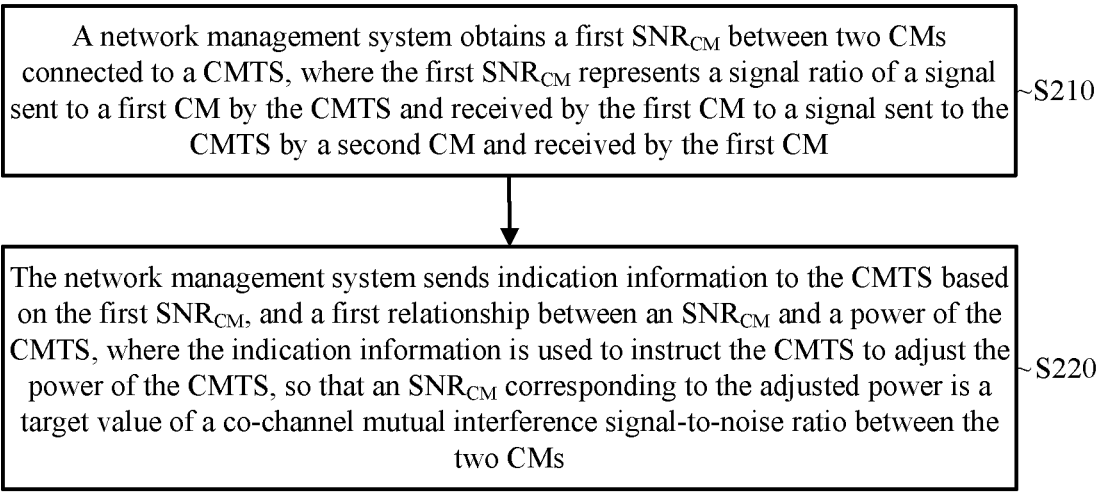
FIG. 2 is a schematic flowchart of a power adjustment method according to an embodiment of the present invention.

According to the foregoing derivation, FIG. 2 shows a schematic flowchart of a power adjustment method according to an embodiment of the present invention. It should be understood that, FIG. 2 shows steps or operations of the power adjustment method. However, these steps or operations are merely an example. In this embodiment of the present invention, other operations or variants of the operations in FIG. 2 may be further performed. In addition, the steps in FIG. 2 may be performed in an order different from that represented in FIG. 2, and probably not all operations in FIG. 2 need to be performed.

S210. A network management system obtains a first $SNR_{CM}$ between two CMs connected to a CMTS, where the first $SNR_{CM}$ represents a signal ratio of a signal sent by the CMTS to a first CM and received by the first CM to a signal sent by a second CM to the CMTS and received by the first CM.

S220. The network management system sends indication information to the CMTS based on the first $SNR_{CM}$, and a first relationship between an $SNR_{CM}$ and a power of the CMTS, where the indication information is used to instruct the CMTS to adjust the power of the CMTS, so that an $SNR_{CM}$ corresponding to the adjusted power is a target value of a co-channel mutual interference signal-to-noise ratio between the two CMs.

The target value of the co-channel mutual interference signal-to-noise ratio between the two CMs is an $SNR_{CM}$ between the two CMs after power adjustment performed by the CMTS, and may be a fixed value, or may be a range.

In S220, the power of the CMTS may be a transmit power at which the CMTS sends the signal to the first CM. Correspondingly, the first relationship may be a change relationship that is between PT and $SNR_{CM}$ and that is obtained according to $SNR_{CM}=SNR_{topology}-(PR-PT)$. The indication information is used to instruct the CMTS to adjust the transmit power at which the CMTS sends the signal to the first CM. The adjusted power is an adjusted transmit power at which the CMTS sends the signal to the first CM.

The power of the CMTS may alternatively be a receive power at which the CMTS receives the signal sent by the second CM. Correspondingly, the first relationship may be a change relationship that is between PR and $SNR_{CM}$ and that is obtained according to $SNR_{CM}=SNR_{topology}-(PR-PT)$. The indication information is used to instruct the CMTS to adjust the receive power at which the CMTS receives the signal sent by the second CM. The adjusted power is an adjusted receive power at which the CMTS receives the signal sent by the second CM.

The power of the CMTS may alternatively be both the transmit power at which the CMTS sends the signal to the first CM and the receive power at which the CMTS receives the signal sent by the second CM. Correspondingly, the first relationship may be a change relationship that is between PT and PR, and $SNR_{CM}$ and that is obtained according to $SNR_{CM}=SNR_{topology}-(PR-PT)$. The indication information is used to instruct the CMTS to adjust the transmit power at which the CMTS sends the signal to the first CM and adjust the receive power at which the CMTS receives the signal sent by the second CM. The adjusted power is an adjusted transmit power at which the CMTS sends the signal to the first CM and an adjusted receive power at which the CMTS receives the signal sent by the second CM.

In this embodiment of the present invention, the network management system instructs, based on the obtained $SNR_{CM}$ between the CMs, a co-channel mutual interference signal-to-noise ratio threshold, and a relationship between the $SNR_{CM}$ and the transmit power at which the CMTS sends the signal to the CM, the CMTS to adjust the transmit power at which the CMTS sends the signal to the CM, so that an $SNR_{CM}$ that corresponds to the adjusted transmit power at which the CMTS sends the signal to the CM and that is between the two CMs meets a requirement. In other words, the co-channel mutual interference signal-to-noise ratio between the CMs is flexibly adjusted by adjusting the power, thereby flexibly grouping the CMs.

In this embodiment of the present invention, when a frequency at which the CMTS sends a signal to the first CM is the same as a frequency at which the CMTS receives a signal sent by the second CM, a signal that remains after self-interference cancellation is performed on a signal that is received by the CMTS and sent to the first CM affects or interferes with a signal sent by the second CM and received by the CMTS. This impact or interference may be referred to as a co-channel self-interference cancellation capability signal-to-noise ratio, which is short for $SNR_{CMTS}$. In other words, the signal sent by the second CM and received by the CMTS may be used as a wanted signal, the signal that remains after self-interference cancellation is performed on the signal that is received by the CMTS and sent to the first CM is used as noise, and impact or interference of the remaining signal on or to the wanted signal may be represented by using a signal ratio of the wanted signal to the remaining signal.

Specifically, $SNR_{CMTS}=PR-PT+SNR_{cancellation}$, where $SNR_{cancellation}$ represents a self-interference cancellation gain of the CMTS, that is, an SNR cancellation gain that can be implemented by a co-channel self-interference cancellation module (or a co-channel self-interference cancellation apparatus) of the CMTS, and is generally a fixed value.

It can be learned that, when PR is increased by a value, or PT is decreased by a value, or (PR−PT) is increased by a value, $SNR_{CMTS}$ is correspondingly increased by the value; or when PR is decreased by a value, or PT is increased by a value, or (PR−PT) is decreased by a value, $SNR_{CMTS}$ is correspondingly decreased by the value. Conversely, when $SNR_{CMTS}$ is increased by a value, correspondingly, PR is increased by the value, or PT is decreased by the value, or (PR−PT) is increased by the value; or when $SNR_{CMTS}$ is decreased by a value, correspondingly, PR is decreased by the value, or PT is increased by the value, or (PR−PT) is decreased by the value.

Therefore, in this embodiment of the present invention, the power adjustment method may further include: obtaining, by the network management system, a first $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM; and sending, by the network management system, the indication information to the CMTS based on the first $SNR_{CMTS}$, a co-channel self-interference cancellation capability signal-to-noise ratio threshold, and a second relationship between an $SNR_{CMTS}$ and the power of the CMTS, where the indication information is used to instruct the CMTS to adjust the power of the CMTS.

The power of the CMTS may be the transmit power at which the CMTS sends the signal to the first CM. Correspondingly, the second relationship may be a change relationship that is between PT and $SNR_{CMTS}$ and that is obtained according to $SNR_{CMTS}=PR-PT+SNR_{cancellation}$. The indication information is used to instruct the CMTS to adjust the transmit power at which the CMTS sends the signal to the first CM. The adjusted power is an adjusted transmit power at which the CMTS sends the signal to the first CM.

The power of the CMTS may alternatively be a receive power at which the CMTS receives the signal sent by the second CM. Correspondingly, the second relationship may be a change relationship that is between PR and $SNR_{CMTS}$ and that is obtained according to $SNR_{CMTS}=PR-PT+SNR_{cancellation}$. The indication information is used to instruct the CMTS to adjust the receive power at which the CMTS receives the signal sent by the second CM. The adjusted power is an adjusted receive power at which the CMTS receives the signal sent by the second CM.

The power of the CMTS may alternatively be both the transmit power at which the CMTS sends the signal to the first CM and the receive power at which the CMTS receives the signal sent by the second CM. Correspondingly, the second relationship may be a change relationship that is between PT and PR, and $SNR_{CMTS}$ and that is obtained according to $SNR_{CMTS}=PR-PT+SNR_{cancellation}$. The indication information is used to instruct the CMTS to adjust the transmit power at which the CMTS sends the signal to the first CM and adjust the receive power at which the CMTS receives the signal sent by the second CM. The adjusted power is an adjusted transmit power at which the CMTS sends the signal to the first CM and an adjusted receive power at which the CMTS receives the signal sent by the second CM.

In this embodiment of the present invention, the network management system adjusts the power of the CMTS based on the $SNR_{CMTS}$ of the CMTS, and adequate consideration is given to a relationship between the power of the CMTS and the $SNR_{CMTS}$ of the CMTS, so that the $SNR_{CMTS}$ of the CMTS corresponding to the adjusted power of the CMTS can meet a requirement.

In this embodiment of the present invention, the target value of the co-channel mutual interference signal-to-noise ratio between the CMs may be determined based on a CM grouping requirement. The grouping requirement may include one or more of the following: a quantity of CMs in each group does not exceed a threshold; a total quantity of groups is met; some CMs are in one group, some CMs cannot be in one group; and so on.

For example, when the grouping requirement is that two specific CMs are not in a same group, correspondingly, a target value of a co-channel mutual interference signal-to-noise ratio between the two CMs needs to be not less than a threshold of the co-channel mutual interference signal-to-noise ratio between the CMs. In this case, the target value of the co-channel mutual interference signal-to-noise ratio between the two CMs may be a value equal to the threshold of the co-channel mutual interference signal-to-noise ratio between the CMs.

In this embodiment of the present invention, the network management system may determine, based on the $SNR_{CM}$ or based on both the $SNR_{CM}$ and the $SNR_{CMTS}$, that the transmit power at which the CMTS sends the signal to the first CM needs to be adjusted to a first target transmit power; and then send, to the CMTS, indication information carrying the first target transmit power, to instruct the CMTS to adjust the transmit power at which the CMTS sends the signal to the first CM to the first target transmit power. Optionally, the indication information sent by the network management system to the CMTS may carry an adjustment amount of the transmit power at which the CMTS sends the signal to the CM and/or may carry an adjustment amount of the receive power at which the CMTS receives the signal sent by the CM.

In this embodiment of the present invention, a target value (namely, the first target transmit power obtained after adjustment) of the transmit power at which the CMTS sends the signal to the first CM may be the same as or may be different from a target value of a transmit power at which the CMTS sends a signal to another CM. If the target value of the transmit power at which the CMTS sends the signal to the first CM is the same as the target value of the transmit power at which the CMTS sends the signal to the another CM, complexity of sending a signal to a CM by the CMTS can be lowered. If the target value of the transmit power at which the CMTS sends the signal to the first CM is different from the target value of the transmit power at which the CMTS sends the signal to the another CM, flexibility of power adjustment can be improved. Likewise, a target value (namely, the first target receive power obtained after adjustment) of the receive power at which the CMTS receives the signal sent by the second CM may be the same as or may be different from a target value of a receive power at which the CMTS receives a signal sent by another CM.

In this embodiment of the present invention, optionally, the network management system may obtain a plurality of ratios $SNR_{CM}$ and a plurality of ratios $SNR_{CMTS}$, determine, based on both these ratios $SNR_{CM}$ and the plurality of ratios $SNR_{CMTS}$, that receive powers at which the CMTS receives signals sent by a plurality of CMs need to be adjusted to target receive powers and/or that transmit powers at which the CMTS sends signals to the plurality of CMs need to be adjusted to target transmit powers, and then send, to the CMTS, indication information carrying these target receive powers and/or target transmit powers, to instruct the CMTS to adjust the receive powers at which the CMTS receives the signals sent by these CMs to the target receive powers indicated in the indication information and/or adjust the transmit powers at which the CMTS sends the signals to these CMs to the target transmit powers indicated in the indication information.

When the network management system determines, based on a plurality of ratios $SNR_{CM}$ and a plurality of ratios $SNR_{CMTS}$, a target value of a transmit power at which the CMTS sends a signal to each of a plurality of CMs and/or a target value of a receive power at which the CMTS receives a signal sent by each of the plurality of CMs, a plurality of methods such as a least satisfactory method, a traversing method, and a least square method may be used for implementation. It should be understood that, one or more of these methods may be used to determine the target value of the transmit power or the receive power.

The following describes, in detail, a method for determining a target receive power and a target transmit power by the network management system in an embodiment of the present invention by using the least satisfactory method.

Table 1 gives an example of transmit powers and receive powers before the CMTS performs power adjustment. Specifically, an expected power at which the CMTS currently sends a signal to each of five CMs connected to the CMTS is 32 dBmV, and an expected power at which the CMTS currently receives a signal sent by each of the five CMs is 0 dBmV. When the CMTS sends signals to all the CMs in a broadcasting manner, all transmit powers at which the CMTS sends the signals to all the CMs are the same.

TABLE 1

Transmit powers PT1 and receive powers PR1 before a CMTS performs power adjustment

|  | $CM_1$ | $CM_2$ | $CM_3$ | $CM_4$ | $CM_5$ |
| --- | --- | --- | --- | --- | --- |
| PT1/dBmV | 32 | 32 | 32 | 32 | 32 |
| PR1/dBmV | 0 | 0 | 0 | 0 | 0 |

Table 2 shows a co-channel self-interference cancellation capability signal-to-noise ratio when the CMTS uses the transmit powers and the receive powers shown in Table 1. As shown in Table 2, $SNR_{CMTS(1)}$, $SNR_{CMTS(2)}$, $SNR_{CMTS(3)}$, $SNR_{CMTS(4)}$, and $SNR_{CMTS(5)}$ of the CMTS are all 68 dB (dB). Because the powers at which the CMTS sends the signals to all the CMs are the same, when the CMTS receives a signal sent by one of the CMs, it may be considered that interference, to the signal sent by the CM, of signals that are received by the CMTS and sent by the CMTS to all other CMs is the same. To be specific, $SNR_{CMTS(i)}$ represents a ratio of a signal sent by $CM_i$ of the five CMs and received by the CMTS to a signal that remains after self-interference cancellation is performed on a signal that is received by the CMTS and sent by the CMTS to each of the other four CMs.

TABLE 2

Co-channel self-interference cancellation capability signal-to-noise ratios corresponding to PT1 and PR1

| $SNR_{CMTS(1)}$ | $SNR_{CMTS(2)}$ | $SNR_{CMTS(3)}$ | $SNR_{CMTS(4)}$ | $SNR_{CMTS(5)}$ |
| --- | --- | --- | --- | --- |
| 68 | 68 | 68 | 68 | 68 |

Table 3 shows co-channel mutual interference signal-to-noise ratios between the CMs before power adjustment. In Table 3, a co-channel mutual interference signal-to-noise ratio in row i and column j is a co-channel mutual interference signal-to-noise ratio of $CM_i$ of the five CMs to $CM_j$ of the five CMs. For example, 33 dB in row 2 and column 3 means that a co-channel mutual interference signal-to-noise ratio of $CM_2$ to $CM_3$ is 33 dB. Because the powers at which the CMTS sends the signals to all the CMs are the same as powers at which the CMTS receives the signals sent by all the CMs, the co-channel mutual interference signal-to-noise ratio of $CM_i$ to $CM_j$ is the same as a co-channel mutual interference signal-to-noise ratio of $CM_j$ to $CM_i$.

TABLE 3

Co-channel mutual interference signal-to-
noise ratios corresponding to PT1 and PR1

| $SNR_{CM}$/dB | $CM_1$ | $CM_2$ | $CM_3$ | $CM_4$ | $CM_5$ |
|---|---|---|---|---|---|
| $CM_1$ | 6 | 36 | 36 | 36 | 36 |
| $CM_2$ | 36 | 6 | 33 | 33 | 33 |
| $CM_3$ | 36 | 33 | 6 | 30 | 30 |
| $CM_4$ | 36 | 33 | 30 | 6 | 27 |
| $CM_5$ | 36 | 33 | 30 | 27 | 6 |

It is assumed that CMs can be divided into different groups only when a co-channel mutual interference signal-to-noise ratio between the CMs is greater than or equal to 45 dB. In other words, the co-channel mutual interference signal-to-noise ratio threshold is 45 dB. The grouping requirement is that each CM needs to be divided into a group. In other words, a target value of a co-channel mutual interference signal-to-noise ratio between every two CMs after the power adjustment needs to be greater than or equal to 45 dB. All co-channel self-interference cancellation capability signal-to-noise ratios after the power adjustment need to be greater than or equal to 40 dB. In other words, the co-channel self-interference cancellation capability signal-to-noise ratio threshold is 40 dB.

When the least satisfactory method is used to determine powers, ratios $SNR_{CM}$ that play a decisive role in grouping are mainly determined according to a grouping requirement. Decisive ratios $SNR_{CM}$ may be all or some of the ratios $SNR_{CM}$. Then, a smallest ratio $SNR_{CM}$ in the decisive ratios $SNR_{CM}$ is determined. Next, an increment for the smallest $SNR_{CM}$ to reach the co-channel mutual interference signal-to-noise ratio threshold is determined, and then all the ratios $SNR_{CM}$ are increased by the increment.

Specifically, in Table 3, in order to meet the grouping requirement, each CM is divided into a group. Co-channel mutual interference signal-to-noise ratios of each CM to all other CMs need to be greater than or equal to 45 dB. In other words, all values, except those on a diagonal, in Table 3 need to be greater than or equal to 45 dB.

It is found that a current smallest co-channel mutual interference signal-to-noise ratio between CMs in Table 3 is the $SNR_{CM}$ in row 4 and column 5, and is 27. In order to divide $CM_4$ and $CM_5$ into different groups, a target value of an $SNR_{CM}$ of $CM_4$ to $CM_5$ may be 45. In this case, the $SNR_{CM}$ of $CM_4$ to $CM_5$ needs to be increased by 18 dB. At the same time, all ratios $SNR_{CM}$ between the CMs are increased by 18 dB, and target values of the co-channel mutual interference signal-to-noise ratios between the CMs are obtained, as shown in Table 4.

TABLE 4

Target values of co-channel mutual
interference signal-to-noise ratios

| $SNR_{CM}$/dB | $CM_1$ | $CM_2$ | $CM_3$ | $CM_4$ | $CM_5$ |
|---|---|---|---|---|---|
| $CM_1$ | 24 | 54 | 54 | 54 | 54 |
| $CM_2$ | 54 | 24 | 51 | 51 | 51 |
| $CM_3$ | 54 | 51 | 24 | 48 | 48 |
| $CM_4$ | 54 | 51 | 48 | 24 | 45 |
| $CM_5$ | 54 | 51 | 48 | 45 | 24 |

It may be learned, from the foregoing relationship between the co-channel mutual interference signal-to-noise ratio, and the receive power and the transmit power, that the ratios $SNR_{CM}$ between the CMs are all increased by 18 dB.

In this case, if only the transmit power at which the CMTS sends the signal to the CM is adjusted, that is, the receive power at which the CMTS receives the signal sent by the CM remains unchanged (which is still 0 dBmV), the $SNR_{CM}$ between the CMs may be adjusted by adjusting the transmit power at which the CMTS sends the signal to the CM. Specifically, adjustment values of the transmit powers at which the CMTS sends the signals to all the CMs are all 18 dBmV. In other words, target transmit powers at which the CMTS sends the signals to all the CMs are 50 dBmV, as shown in Table 5.

TABLE 5

Target transmit powers PT2 and target receive powers PR2

| | $CM_1$ | $CM_2$ | $CM_3$ | $CM_4$ | $CM_5$ |
|---|---|---|---|---|---|
| PT2/dBmV | 50 | 50 | 50 | 50 | 50 |
| PR2/dBmV | 0 | 0 | 0 | 0 | 0 |

It may be learned, from the foregoing relationship between the co-channel self-interference cancellation capability signal-to-noise ratio of the CMTS, and the receive power and the transmit power, that a decrease in a difference between the receive power and the transmit power decreases the co-channel self-interference cancellation capability signal-to-noise ratio. Specifically, in this specific embodiment, five co-channel self-interference cancellation capability signal-to-noise ratios of the CMTS all decrease by 18 dB. In other words, five co-channel self-interference cancellation capability signal-to-noise ratios corresponding to the target receive power and the target transmit power are 50 dB, as shown in Table 6.

TABLE 6

Co-channel self-interference cancellation capability
signal-to-noise ratios corresponding to PT2 and PR2

| $SNR_{CMTS(1)}$ | $SNR_{CMTS(2)}$ | $SNR_{CMTS(3)}$ | $SNR_{CMTS(4)}$ | $SNR_{CMTS(5)}$ |
|---|---|---|---|---|
| 50 | 50 | 50 | 50 | 50 |

The determined co-channel self-interference cancellation capability signal-to-noise ratios are 50 dB, and are all greater than the co-channel self-interference cancellation capability signal-to-noise ratio threshold 40 dB. Therefore, the foregoing expected transmit power and receive power are appropriate. In other words, the target transmit power (50 dBmV) at which the CMTS sends the signal to the CM and the target receive power (0 dBmV) at which the CMTS receives the signal sent by the CM do not need to be adjusted. In this case, the network management system may send, to the CMTS, indication information carrying the target transmit power 50 dBmV, to instruct the CMTS to adjust a power at which the CMTS sends the signals to the five CMs to 50 dBmV.

After determining the target transmit power at which the CMTS sends the signal to the CM and/or the target receive power at which the CMTS receives the signal sent by the CM, the network management system may further optimize the determined target transmit power and/or target receive power, to further improve bandwidth utilization and efficiency of a co-frequency duplex system in an entire communications network.

As shown in Table 5, there are many ratios $SNR_{CM}$ greater than the co-channel mutual interference signal-to-noise ratio threshold 45 dB. These overlarge ratios $SNR_{CM}$ are wasteful for an entire system. These overlarge ratios $SNR_{CM}$ may be optimized by adjusting PR2.

An $SNR_{CM}$ between $CM_4$ and $CM_3$ and an $SNR_{CM}$ between $CM_5$ and $CM_3$ are 48 dB, and are 3 dB larger than the co-channel mutual interference signal-to-noise ratio threshold. It may be learned, from the foregoing described relationship between the $SNR_{CM}$ and the receive power at which the CMTS receives the signal sent by the CM, that a target receive power at which the CMTS receives a signal sent by $CM_3$ may be increased by 3 dB, so that the target receive power at which the CMTS receives the signal sent by $CM_3$ is 6 dBmV. Likewise, ratios $SNR_{CM}$ between $CM_3$, $CM_4$, and $CM_5$, and $CM_2$ are 6 dB larger than the co-channel mutual interference signal-to-noise ratio threshold. A target receive power at which the CMTS receives a signal sent by $CM_2$ may be increased by 6 dB, so that the target receive power at which the CMTS receives the signal sent by $CM_2$ is 6 dBmV. Likewise, a target receive power at which the CMTS receives a signal sent by $CM_1$ may be increased by 9 dB, so that the target receive power at which the CMTS receives the signal sent by $CM_1$ is 9 dBmV. Optimized target transmit powers PT3 and target receive powers PR3 are shown in table 7. Corresponding co-channel mutual interference signal-to-noise ratios between the CMs are shown in Table 8.

TABLE 7

Target transmit powers PT3 and target receive powers PR3

| | $CM_1$ | $CM_2$ | $CM_3$ | $CM_4$ | $CM_5$ |
|---|---|---|---|---|---|
| PT3/dBmV | 50 | 50 | 50 | 50 | 50 |
| PR3/dBmV | 9 | 6 | 3 | 0 | 0 |

TABLE 8

Co-channel mutual interference signal-to-noise ratios corresponding to PT3 and PR3

| $SNR_{CM}$/dB | $CM_1$ | $CM_2$ | $CM_3$ | $CM_4$ | $CM_5$ |
|---|---|---|---|---|---|
| $CM_1$ | 24 | 45 | 45 | 45 | 45 |
| $CM_2$ | 48 | 24 | 45 | 45 | 45 |
| $CM_3$ | 51 | 51 | 24 | 45 | 45 |
| $CM_4$ | 54 | 51 | 48 | 24 | 45 |
| $CM_5$ | 54 | 51 | 48 | 45 | 24 |

Correspondingly, the co-channel self-interference cancellation capability signal-to-noise ratio may change after the target receive power is re-determined. Optimized co-channel self-interference cancellation capability signal-to-noise ratios are shown in Table 9. It can be learned from Table 9 that, co-channel self-interference cancellation capability signal-to-noise ratios corresponding to the optimized target receive power are all greater than the co-channel self-interference cancellation capability signal-to-noise ratio threshold. To be specific, the target receive power PR3 and the target transmit power PT3 do not need to be adjusted again.

TABLE 9

Co-channel self-interference cancellation capability signal-to-noise ratios corresponding to PT3 and PR3

| $SNR_{CMTS(1)}$ | $SNR_{CMTS(2)}$ | $SNR_{CMTS(3)}$ | $SNR_{CMTS(4)}$ | $SNR_{CMTS(5)}$ |
|---|---|---|---|---|
| 59 | 56 | 53 | 50 | 50 |

Certainly, in this embodiment of the present invention, the target transmit power at which the CMTS sends the signal to the CM and/or the target receive power at which the CMTS receives the signal sent by the CM may also be determined by using the traversing method. Specifically, a plurality of transmit powers at which the CMTS can send the signal to the CM and a plurality of receive powers at which the CMTS can receive the signal sent by the CM are obtained. Then, co-channel mutual interference signal-to-noise ratios and co-channel self-interference cancellation capability signal-to-noise ratios corresponding to the plurality of transmit powers that can be used and the plurality of received powers that can be used are calculated separately. The target transmit power at which the CMTS sends the signal to the CM and the target receive power at which the CMTS receives the signal sent by the CM are determined from transmit powers and receive powers corresponding to co-channel self-interference cancellation capability signal-to-noise ratios and co-channel mutual interference signal-to-noise ratios greater than the co-channel mutual interference signal-to-noise ratio threshold that meet a grouping requirement.

In this embodiment of the present invention, the target transmit power at which the CMTS sends the signal to the CM and the target receive power at which the CMTS receives the signal sent by the CM may also be determined by using the least square method. Specifically, the target receive power (or the adjustment amount of the receive power) at which the CMTS receives the signal sent by the CM and the target transmit power (or the adjustment amount of the transmit power) at which the CMTS sends the signal to the CM are set as unknown numbers. The co-channel mutual interference signal-to-noise ratio and the co-channel self-interference cancellation capability signal-to-noise ratio are designed as constraint conditions. A system of linear equations is established based on a relationship between the target receive power (or the adjustment amount of the receive power) and the target transmit power (or the adjustment amount of the transmit power). Because a quantity of the equations is greater than a quantity of the unknown numbers, the system of the linear equations is an over-determined system of equations. Optimal solutions for the unknown numbers may be determined by using the least square method.

More specifically, assuming that the target receive power at which the CMTS receives the signal sent by the CM and the target transmit power at which the CMTS sends the signal to the CM have a total of 10 unknown numbers, 20 equations may be obtained based on a condition that the target receive power and the target transmit power should meet the co-channel mutual interference signal-to-noise ratio, and 5 equations may be obtained based on a condition that the target receive power and the target transmit power need to meet the co-channel self-interference cancellation capability signal-to-noise ratio. It can be learned that, in this embodiment of the present invention, a problem of determining the target receive power and the target transmit power may be converted into a problem of solving optimal solutions for the 10 unknown numbers based on an over-determined system of non-homogeneous linear equations that includes 25 equations. The system of equations may be represented as A*X=B, where A is a 25*10 coefficient matrix, X is a 10*1 unknown number matrix, and B is a 25*1 value matrix. The optimal solutions for the unknown numbers may be determined by using the least square method. A specific algorithm may be obtained through matrix inversion. To be specific, the optimal solution is $X=(A'*A)^{-1}*A'*B$, where A' is a transposed matrix of A.

In this embodiment of the present invention, the CMTS may obtain the $SNR_{CMTS}$ by using a plurality of methods. In one method, the $SNR_{CMTS}$ is obtained through calculation. Specifically, the $SNR_{CMTS}$ is obtained through calculation according to $SNR_{CMTS}=PR-PT+SNR_{cancellation}$.

In another method, the $SNR_{CMTS}$ is obtained by demodulating and analyzing a modulation error ratio (MER) of an uplink signal that has an interfering signal and that is received by the CMTS. Herein, the interfering signal is a signal that remains after self-interference cancellation is performed on the signal that is received by the CMTS and sent by the CMTS to the second CM. The uplink signal is a signal sent by the first CM and received by the CMTS. In other words, an MER, demodulated and analyzed by the CMTS, of the received uplink signal having the interfering signal may be used to represent the $SNR_{CMTS}$.

After obtaining the $SNR_{CMTS}$, the CMTS may send the $SNR_{CMTS}$ to the network management system. To be specific, a specific implementation in which the network management system obtains the $SNR_{CMTS}$ may be receiving, by the network management system, the $SNR_{CMTS}$ sent by the CMTS.

In this embodiment of the present invention, the first CM may obtain the $SNR_{CM}$ by using a plurality of methods, and then the first CM may send the $SNR_{CM}$ to the CMTS or the network management system. To be specific, a specific implementation in which the network management system obtains the $SNR_{CM}$ between the CMs may be receiving, by the network management system, the $SNR_{CM}$ sent by the first CM.

A manner of obtaining the $SNR_{CM}$ by the first CM is obtaining the $SNR_{CM}$ by the first CM by using a measurement and calculation method. Specifically, the first CM measures a power (PD for short) at which the first CM receives the signal when the signal sent by the CMTS arrives at the first CM, and measures a power (PI for short) at which the first CM receives the interfering signal when the interfering signal sent by the second CM arrives at the first CM. In this case, a co-channel mutual interference signal-to-noise ratio $SNR_{CM}$ of the second CM to the first CM is equal to PD-PI.

Another manner of obtaining the $SNR_{CM}$ by the first CM is: When the second CM, sends the interfering signal, the first CM demodulates and analyzes an MER of the signal sent by the CMTS and received by the first CM when the signal arrives at the first CM, and then $SNR_{CM}$=MER is obtained.

In this embodiment of the present invention, the network management system sends the indication information to the CMTS. After receiving the indication information, the CMTS may adjust, based on the indication information, the transmit power at which the CMTS sends the signal to the CM and/or the receive power at which the CMTS receives the signal sent by the CM.

A method for adjusting a power by the CMTS includes: receiving, by the CMTS, the indication information sent by the network management system; and adjusting, by the CMTS, the power of the CMTS based on the indication information, where an $SNR_{CM}$ corresponding to the adjusted power is equal to the target value of the co-channel mutual interference signal-to-noise ratio, and the $SNR_{CM}$ represents the signal ratio of the signal sent by the CMTS to the first CM and received by the first CM to the signal sent by the second CM to the CMTS and received by the first CM.

In this embodiment of the present invention, the power of the CMTS may be a transmit power at which the CMTS sends the signal to the first CM. Correspondingly, the CMTS adjusts, based on the indication information, the transmit power at which the CMTS sends the signal to the first CM. The adjusted power is an adjusted transmit power at which the CMTS sends the signal to the first CM.

The power of the CMTS may alternatively be a receive power at which the CMTS receives the signal sent by the second CM. Correspondingly, the CMTS adjusts, based on the indication information, the receive power at which the CMTS receives the signal sent by the second CM. The adjusted power is an adjusted receive power at which the CMTS receives the signal sent by the second CM.

The power of the CMTS may alternatively be both the transmit power at which the CMTS sends the signal to the first CM and the receive power at which the CMTS receives the signal sent by the second CM. Correspondingly, the CMTS adjusts, based on the indication information, the transmit power at which the CMTS sends the signal to the first CM and the receive power at which the CMTS receives the signal sent by the second CM. The adjusted power is an adjusted transmit power at which the CMTS sends the signal to the first CM and an adjusted receive power at which the CMTS receives the signal sent by the second CM.

Optionally, an $SNR_{CMTS}$ corresponding to the adjusted power is greater than or equal to the co-channel self-interference cancellation capability signal-to-noise ratio threshold. The $SNR_{CMTS}$ represents a signal ratio of a signal sent by the second CM and received by the CMTS to a signal that remains after self-interference cancellation is performed on a signal that is received by the CMTS and sent by the CMTS to the first CM.

Optionally, the indication information may carry the first target transmit power at which the CMTS sends the signal to the first CM and/or carry the first target receive power at which the CMTS receives the signal sent by the second CM. Correspondingly, the adjusting, by the CMTS, the power of the CMTS based on the indication information includes: adjusting, by the CMTS, the transmit power at which the CMTS sends the signal to the first CM to the first target transmit power, and/or adjusting the receive power at which the CMTS receives the signal sent by the second CM to the first target receive power.

Optionally, the first target transmit power may be different from or the same as a target transmit power at which the CMTS sends a signal to another CM. The first target receive power may be different from or the same as a target receive power at which the CMTS receives a signal sent by another CM.

When the first target receive power is different from the target receive power at which the CMTS receives the signal sent by the another CM, the CMTS may separately instruct, based on a receive power at which the CMTS actually receives the signal sent by the CM, the CM to adjust a transmit power at which the CM sends the signal to the CMTS.

In this embodiment of the present invention, a method for instructing, by the CMTS, the CM to adjust the transmit power includes: measuring, by the CMTS, a first receive power at which the CMTS actually receives the signal sent by the first CM; determining, by the CMTS based on the first receive power and the first target receive power, an adjustment value of a transmit power at which the first CM sends the signal to the CMTS; and sending, by the CMTS to the first CM, a message carrying the adjustment value, so that the first CM adjusts, based on the adjustment value, the transmit power at which the first CM sends the signal to the CMTS.

A specific implementation of the determining, by the CMTS based on the first receive power and the first target receive power, an adjustment value of a transmit power at which the first CM sends the signal to the CMTS is: subtracting, by the CMTS, the first receive power from the first target receive power, to obtain the adjustment value.

If the first target receive power is denoted as $PW_{expect}$, and the first receive power is denoted as $PW_{Rx}$, it can be obtained through calculation that the adjustment value $PW_{adjust}$ of the transmit power of the first CM is a difference between $PW_{expect}$ and $PW_{Rx}$.

For example, if first target receive powers (namely, $PW_{expect}$) at which the CMTS receives signals sent by $CM_i$ and $CM_j$ are 0 dBmV and 3 dBmV respectively, and receive powers (namely, first receive powers $PW_{Rx}$), obtained by the CMTS through measurement, at which the CMTS currently receives the signal sent by CM and the signal sent by $CM_j$ are −2 dBmV and −1 dBmV respectively, a difference between the first target receive power and the first receive power at which the CMTS receives the signal sent by $CM_i$ is 2 dB, and a difference between the first target receive power and the first receive power at which the CMTS receives the signal sent by $CM_j$ is 4 dB. Therefore, the CMTS sends information about a power adjustment value of 2 dB to $CM_i$ in a form of a message, and sends information about a power adjustment value of 4 dB to $CM_j$ in a form of a message. After receiving respective messages, $CM_i$ and $CM_j$ perform corresponding power adjustment.

Another method for instructing, by the CMTS, the CM to adjust the transmit power includes: measuring, by the CMTS, a second receive power at which the CMTS actually receives the signal sent by the first CM; obtaining, by the CMTS, an average expected receive power and a compensated receive power, where the average expected receive power is a same expected target receive power at which the CMTS receives signals sent by the first CM and the another CM, and the compensated receive power is a power needing to be compensated for adjusting the average expected receive power to the first target receive power; determining, by the CMTS based on the second receive power, the average expected receive power, and the compensated receive power, an adjustment value of a transmit power at which the first CM sends the signal to the CMTS; and sending, by the CMTS to the first CM, a message carrying the adjustment value, so that the first CM adjusts, based on the adjustment value, the transmit power at which the first CM sends the signal to the CMTS.

A specific implementation of the determining, by the CMTS based on the first receive power, the average expected receive power, and the compensated receive power, an adjustment value of a transmit power at which the first CM sends the signal to the CMTS is: performing, by the CMTS, calculation of: Average expected receive power− First receive power+Compensated receive power, to obtain the adjustment value.

Another specific implementation of the determining, by the CMTS based on the first receive power, the average expected receive power, and the compensated receive power, an adjustment value of a transmit power at which the first CM sends the signal to the CMTS is: performing, by the CMTS, calculation of: Average expected receive power− First receive power, to obtain the adjustment value.

Specifically, the CMTS obtains the first receive power, which is denoted as $PW_{Rx}$. Then, the CMTS calculates $PW_{adjust1}=PW_{expect\_average}-PW_{Rx}$, where $PW_{adjust1}$ is a pre-adjustment value of the transmit power at which the first CM sends the signal, and $PW_{expect\_average}$ is an average expected power. Next, the CMTS calculates $PW_{adjust}=PW_{adjust1}+PW_{offset}$, to obtain a final adjustment value $PW_{adjust}$ of the transmit power at which the first CM sends the signal to the CMTS.

Certainly, the CMTS may directly calculate $PW_{expect\_average}-PW_{Rx}+PW_{offset}$, to obtain $PW_{adjust}$.

Optionally, the CMTS may have an enable parameter. When enable=0, $PW_{adjust}=PW_{adjust1}=PW_{expect\_average}-PW_{Rx}$ is directly obtained. In this case, receive powers at which the CMTS receives signals sent by all the CMs are the same. When enable=1, $PW_{adjust}=PW_{expect\_average}-PW_{Rx}+PW_{offset}$ is obtained. Receive powers at which the CMTS receives signals sent by different CMs may be different.

For example, an average expected power of the CMTS is 1 dBmV, and compensated receive powers of $CM_i$ and $CM_j$ are −1 dB and 2 dB respectively.

When receive powers, obtained by the CMTS through measurement, at which the CMTS currently receives signals sent by $CM_i$ and $CM_j$ are −2 dBmV and −1 dBmV respectively, it may be obtained through calculation that adjustment values of transmit powers at which $CM_i$ and $CM_j$ send the signals are 2 dB and 4 dB respectively.

On a CM side, after receiving indication information sent by the CMTS, the CM adjusts the transmit power at which the CM sends the signal, so that a receive power at which the CMTS receives the signal that is sent by the CM at the transmit power is an expected receive power, determined by the network management system, at which the CMTS receives the signal sent by the CM.

Correspondingly, on the CM side, the CM receives the indication information sent by the CMTS. The CM adjusts, based on the indication information, the transmit power at which the CM sends the signal to the CMTS, so that the receive power at which the CMTS receives the signal that is sent by the CM at the transmit power is the first target receive power, where the first target receive power is different from a target receive power at which the CMTS receives a signal sent by another CM.

In this embodiment of the present invention, the CMTS may obtain the first target receive power from the network management system. The CMTS may measure, by using a ranging signal or a probing signal, a power at which the CMTS currently receives the signal sent by the first CM, to obtain the first target receive power.

The foregoing describes the power adjustment method in the present invention, and the following describes a network management system, a CMTS, a CM, and a cable communications system in the present invention with reference to FIG. 3 to FIG. 14.

Figure 3:
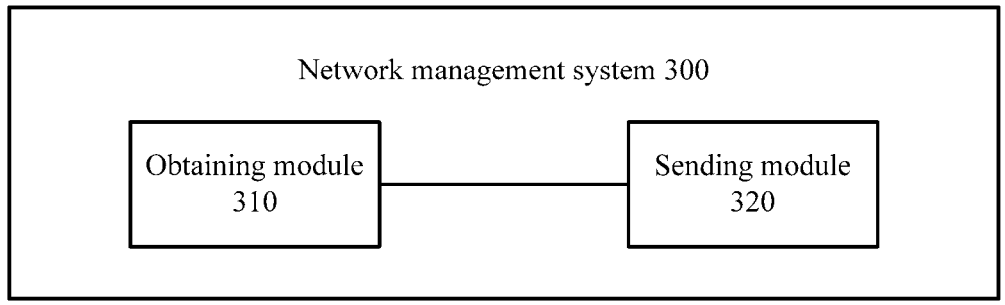
FIG. 3 is a schematic structural diagram of a network management system according to an embodiment of the present invention.

FIG. 3 is a schematic structural diagram of a network management system according to an embodiment of the present invention. It should be understood that, the network management system 300 shown in FIG. 3 is merely an example, and the network management system in this embodiment of the present invention may further include another module or unit, or may include modules whose functions are similar to those of modules in FIG. 3, or may not include all modules in FIG. 3.

An obtaining module 310 is configured to obtain a first co-channel mutual interference signal-to-noise ratio $SNR_{CM}$ between two cable modems CMs connected to a cable modem termination system CMTS, where the first $SNR_{CM}$ represents a signal ratio of a signal sent by the CMTS to a first CM and received by the first CM to a signal sent by a second CM to the CMTS and received by the first CM.

A sending module 320 is configured to send indication information to the CMTS based on the first $SNR_{CM}$, and a first relationship between an $SNR_{CM}$ and a receive power at which the CMTS receives a signal sent by the CM, where the indication information is used to instruct the CMTS to adjust the receive power at which the CMTS receives the signal sent by the second CM, so that an $SNR_{CM}$ corresponding to the adjusted receive power is a target value of a co-channel mutual interference signal-to-noise ratio.

In this embodiment of the present invention, the network management system determines, based on the obtained co-channel mutual interference signal-to-noise ratio between the CMs, and a relationship between the co-channel mutual interference signal-to-noise ratio and the transmit power at which the CMTS sends the signal to the CM, how the CMTS should adjust the transmit power at which the CMTS sends the signal to the CM; and sends indication information to the CMTS, to instruct the CMTS to adjust the transmit power at which the CMTS sends the signal to the CM, so that when the CMTS sends the signal to the CM at the adjusted transmit power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the transmit power, and flexibly group the CMs.

Optionally, in an embodiment, the obtaining module is further configured to: obtain a first co-channel self-interference cancellation capability signal-to-noise ratio $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM. The sending module 320 is specifically configured to: send the indication information to the CMTS based on the first $SNR_{CM}$, the first relationship, the first $SNR_{CMTS}$, and a second relationship between an $SNR_{CMTS}$ and the receive power at which the CMTS receives the signal sent by the CM, where the indication information is used to instruct the CMTS to adjust the receive power at which the CMTS receives the signal sent by the second CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold.

Optionally, in an embodiment, the indication information carries a first target receive power at which the CMTS receives the signal sent by the second CM, and the indication information is specifically used to instruct the CMTS to adjust the receive power at which the CMTS receives the signal sent by the second CM to the first target receive power.

Optionally, in an embodiment, the first target transmit power is different from a target transmit power at which the CMTS sends a signal to another CM.

The network management system 300 can perform the steps in the method shown in FIG. 2. For brevity, details are not described herein again.

Figure 4:
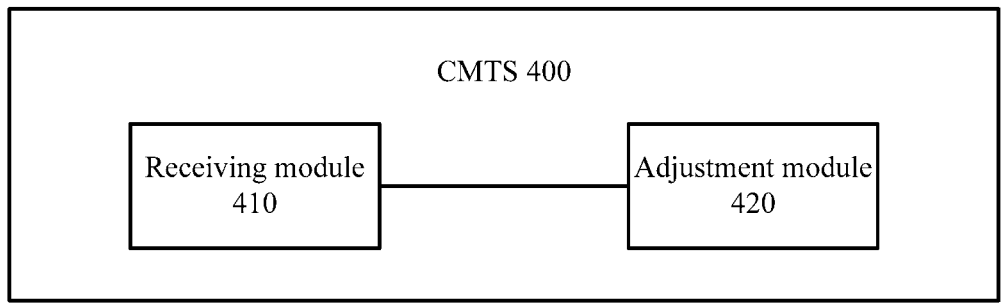
FIG. 4 is a schematic structural diagram of a CMTS according to an embodiment of the present invention.

FIG. 4 is a schematic structural diagram of a CMTS according to an embodiment of the present invention. It should be understood that, the CMTS 400 shown in FIG. 4 is merely an example, and the CMTS in this embodiment of the present invention may further include another module or unit, or may include modules whose functions are similar to those of modules in FIG. 4, or may not include all modules in FIG. 4.

A receiving module 410 is configured to receive indication information sent by a network management system.

An adjustment module 420 is configured to adjust, based on the indication information, a receive power at which the CMTS receives a signal sent by a first CM, so that an $SNR_{CM}$ corresponding to the adjusted receive power is a target value of a co-channel mutual interference signal-to-noise ratio, where the $SNR_{CM}$ represents a signal ratio of a signal sent by the CMTS to a second CM and received by the second CM to a signal sent by the first CM to the CMTS and received by the second CM.

In this embodiment of the present invention, after receiving the indication information that instructs the CMTS to adjust a transmit power at which the CMTS sends the signal to the CM and that is sent by the network management system, the CMTS may adjust the transmit power based on the indication information, so that an $SNR_{CM}$ between the CMs when the CMTS sends the signal to the CM at the adjusted transmit power is greater than or equal to a co-channel mutual interference signal-to-noise ratio threshold. In other words, the CMTS can flexibly adjust the $SNR_{CM}$ between the CMs by adjusting the transmit power, so that the CMs can be flexibly grouped.

Optionally, in an embodiment, the adjustment module is specifically configured to adjust, based on the indication information, the receive power at which the CMTS receives the signal sent by the first cable modem CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold, where the $SNR_{CMTS}$ represents a signal ratio of the signal sent by the first CM and received by the CMTS to a signal that remains after self-interference cancellation is performed on the signal that is received by the CMTS and sent by the CMTS to the second CM.

Optionally, in an embodiment, the indication information carries a first target receive power at which the CMTS receives the signal sent by the first CM; and the adjustment module 420 is specifically configured to adjust the receive power at which the CMTS receives the signal sent by the first CM to the first target receive power.

Optionally, in an embodiment, the first target transmit power is different from a target transmit power at which the CMTS sends a signal to another CM.

Figure 5:
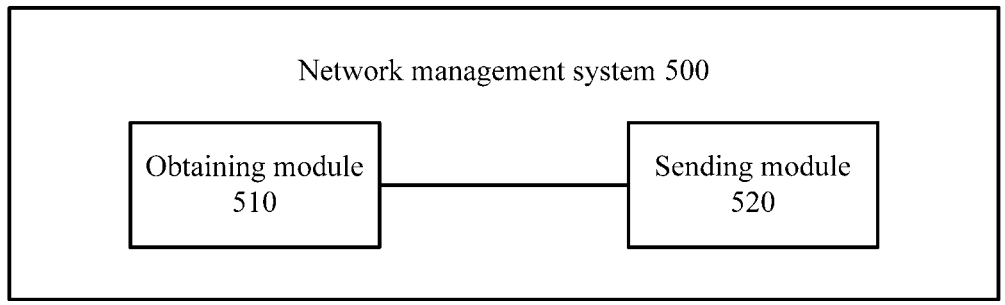
FIG. 5 is a schematic structural diagram of a network management system according to an embodiment of the present invention.

FIG. 5 is a schematic structural diagram of a network management system according to an embodiment of the present invention. It should be understood that, the network management system shown in FIG. 5 is merely an example, and the CM in this embodiment of the present invention may further include another module or unit, or may include modules whose functions are similar to those of modules in FIG. 5, or may not include all modules in FIG. 5.

An obtaining module 510 is configured to obtain a first $SNR_{CM}$ between CMs connected to a CMTS, where the first $SNR_{CM}$ represents a signal ratio of a signal sent by the CMTS to a first CM and received by the first CM to a signal sent by a second CM to the CMTS and received by the first CM.

A sending module 520 is configured to send indication information to the CMTS based on the first $SNR_{CM}$, and a first relationship between an $SNR_{CM}$ and a receive power at which the CMTS receives a signal sent by the CM, where the indication information is used to instruct the CMTS to adjust the receive power at which the CMTS receives the signal sent by the second CM, so that an $SNR_{CM}$ corresponding to the adjusted receive power is a target value of a co-channel mutual interference signal-to-noise ratio.

In this embodiment of the present invention, the network management system determines, based on the obtained co-channel mutual interference signal-to-noise ratio between the CMs, and a relationship between the co-channel mutual interference signal-to-noise ratio and the receive power at which the CMTS receives the signal sent by the CM, how the CMTS should adjust the receive power at which the CMTS receives the signal sent by the CM; and sends indication information to the CMTS, to instruct the CMTS to adjust the receive power at which the CMTS receives the signal sent by the CM, so that when the CMTS receives the signal sent by the CM at the adjusted receive power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the receive power, and flexibly group the CMs.

Optionally, in an embodiment, the obtaining module 510 is further configured to obtain a first $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM. The sending module is specifically configured to send the indication information to the CMTS based on the first $SNR_{CM}$, the first relationship, the first $SNR_{CMTS}$, and a second relationship between an $SNR_{CMTS}$ and the receive power at which the CMTS receives the signal sent by the CM, where the indication information is used to instruct the CMTS to adjust the receive power at which the CMTS receives the signal sent by the second CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold.

Optionally, in an embodiment, the indication information carries a first target receive power at which the CMTS receives the signal sent by the second CM, and the indication information is specifically used to instruct the CMTS to adjust the receive power at which the CMTS receives the signal sent by the second CM to the first target receive power.

Optionally, in an embodiment, the first target receive power is different from a target receive power at which the CMTS receives a signal sent by another CM.

Figure 6:
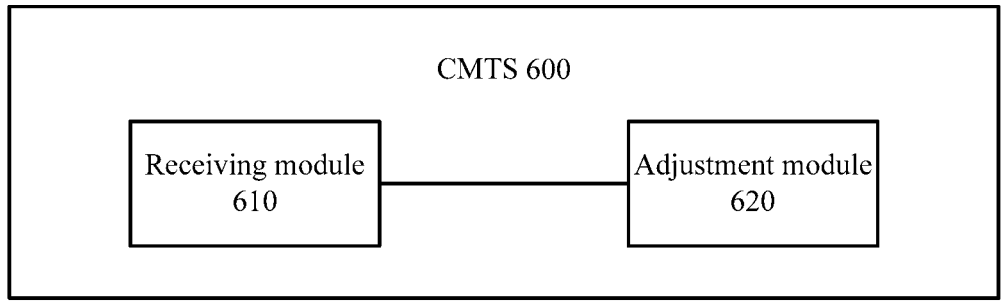
FIG. 6 is a schematic structural diagram of a CMTS according to an embodiment of the present invention.

FIG. 6 is a schematic structural diagram of a CMTS according to an embodiment of the present invention. It should be understood that, the CMTS 600 shown in FIG. 6 is merely an example, and the CMTS in this embodiment of the present invention may further include another module or unit, or may include modules whose functions are similar to those of modules in FIG. 6, or may not include all modules in FIG. 6.

A receiving module 610 is configured to receive indication information sent by a network management system.

An adjustment module 620 is configured to adjust, based on the indication information, a receive power at which the CMTS receives a signal sent by a first cable modem CM, so that an $SNR_{CM}$ corresponding to the adjusted receive power is a target value of a co-channel mutual interference signal-to-noise ratio, where the $SNR_{CM}$ represents a signal ratio of a signal sent by the CMTS to a second CM and received by the second CM to a signal sent by the first CM to the CMTS and received by the second CM.

In this embodiment of the present invention, after receiving indication information that instructs the CMTS to adjust the receive power at which the CMTS receives the signal sent by the CM and that is sent by the network management system, the CMTS may adjust the receive power based on the indication information, so that an $SNR_{CM}$ between the CMs when the CMTS receives the signal sent by the CM at the adjusted receive power is greater than or equal to a co-channel mutual interference signal-to-noise ratio threshold. In other words, the CMTS can flexibly adjust the $SNR_{CM}$ between the CMs by adjusting the receive power, so that the CMs can be flexibly grouped.

Optionally, in an embodiment, the adjustment module is specifically configured to adjust, based on the indication information, the receive power at which the CMTS receives the signal sent by the first CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold, where the $SNR_{CMTS}$ represents a signal ratio of the signal sent by the first CM and received by the CMTS to a signal that remains after self-interference cancellation is performed on the signal that is received by the CMTS and sent by the CMTS to the second CM.

Optionally, in an embodiment, the indication information carries a first target receive power at which the CMTS receives the signal sent by the first CM; and the adjusting, by the CMTS based on the indication information, the receive power at which the CMTS receives the signal sent by the first CM includes: adjusting, by the CMTS, the receive power at which the CMTS receives the signal sent by the first CM to the first target receive power.

Optionally, in an embodiment, the first target receive power is different from a target receive power at which the CMTS receives a signal sent by another CM.

Optionally, in an embodiment, the CMTS further includes: a determining module, configured to determine, based on a first receive power and the first target receive power, an adjustment value of a transmit power at which the first CM sends the signal to the CMTS, where the first receive power is a receive power at which the CMTS actually receives the signal sent by the first CM; and a sending module, configured to send, to the first CM, a message carrying the adjustment value, so that the first CM adjusts, based on the adjustment value, the transmit power at which the first CM sends the signal to the CMTS.

Optionally, in an embodiment, the determining module is specifically configured to subtract the first receive power from the first target receive power, to obtain the adjustment value.

Optionally, in an embodiment, the CMTS further includes: a determining module, configured to determine, based on a second receive power, an average expected receive power, and a compensated receive power, an adjustment value of a transmit power at which the first CM sends the signal to the CMTS, where the second receive power is a receive power at which the CMTS actually receives the signal sent by the first CM, the average expected receive power is a same expected target receive power at which the CMTS receives signals sent by the first CM and the another CM, and the compensated receive power is a power needing to be compensated for adjusting the average expected receive power to the first target receive power; and a sending module, configured to send, to the first CM, a message carrying the adjustment value, so that the first CM adjusts, based on the adjustment value, the transmit power at which the first CM sends the signal to the CMTS.

Optionally, in an embodiment, the determining module is specifically configured to perform calculation of: Average expected receive power−First receive power+Compensated receive power, to obtain the adjustment value.

Optionally, in an embodiment, the determining module is specifically configured to perform calculation of: Average expected receive power−First receive power, to obtain the adjustment value.

Figure 7:
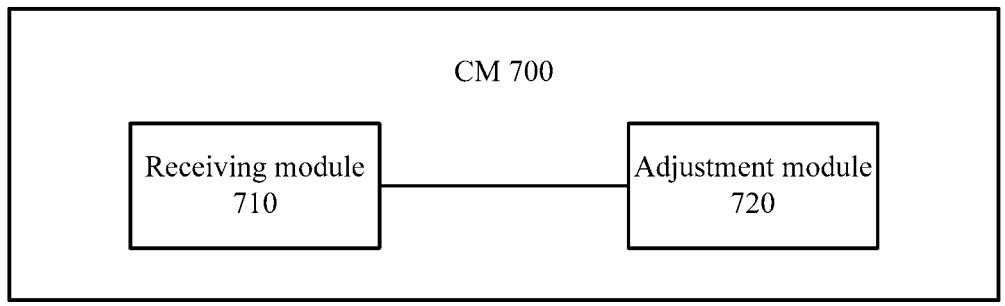
FIG. 7 is a schematic structural diagram of a CM according to an embodiment of the present invention.

FIG. 7 is a schematic structural diagram of a CM according to an embodiment of the present invention. It should be understood that, the CM 700 shown in FIG. 7 is merely an example, and the CM in this embodiment of the present invention may further include another module or unit, or may include modules whose functions are similar to those of modules in FIG. 7, or may not include all modules in FIG. 7.

A receiving module 710 is configured to receive indication information sent by a CMTS.

An adjustment module 720 is configured to adjust, based on the indication information, a transmit power at which the CM sends a signal to the CMTS, so that a receive power at which the CMTS receives the signal that is sent by the CM at the transmit power is a first target receive power, where the first target receive power is different from a target receive power at which the CMTS receives a signal sent by another CM.

In this embodiment of the present invention, when target receive powers at which the CMTS receives signals sent by different CMs are different, each CM may adjust, based on indication information the CMTS, a transmit power at which the CM sends the signal to the CMTS, so that when the CM sends the signal to the CMTS at the adjusted transmit power, a receive power of the CMTS is the target receive power.

Figure 8:
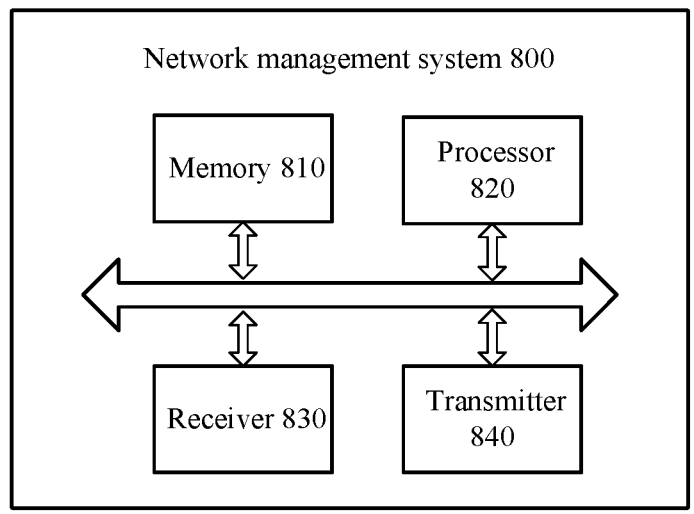
FIG. 8 is a schematic structural diagram of a network management system according to an embodiment of the present invention.

FIG. 8 is a schematic structural diagram of a network management system 800 according to an embodiment of the present invention. The network management system 800 includes a memory 810, a processor 820, a receiver 830, and a transmitter 840.

The memory 810 is configured to store a program.

The processor 820 is configured to execute the program stored in the memory 810.

When the processor 820 executes the program stored in the memory 810, the processor 820 is specifically configured to obtain a first co-channel mutual interference signal-to-noise ratio $SNR_{CM}$ between two cable modems CMs connected to a cable modem termination system CMTS, where the first $SNR_{CM}$ represents a signal ratio of a signal sent by the CMTS to a first CM and received by the first CM to a signal sent by a second CM to the CMTS and received by the first CM.

The transmitter 840 is configured to send indication information to the CMTS based on the first $SNR_{CM}$, and a first relationship between an $SNR_{CM}$ and a receive power at which the CMTS receives a signal sent by the CM, where the indication information is used to instruct the CMTS to adjust the receive power at which the CMTS receives the signal sent by the second CM, so that an $SNR_{CM}$ corresponding to the adjusted receive power is a target value of a co-channel mutual interference signal-to-noise ratio.

In this embodiment of the present invention, the network management system determines, based on the obtained co-channel mutual interference signal-to-noise ratio between the CMs, and a relationship between the co-channel mutual interference signal-to-noise ratio and the transmit power at which the CMTS sends the signal to the CM, how the CMTS should adjust the transmit power at which the CMTS sends the signal to the CM; and sends indication information to the CMTS, to instruct the CMTS to adjust the transmit power at which the CMTS sends the signal to the CM, so that when the CMTS sends the signal to the CM at the adjusted transmit power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the transmit power, and flexibly group the CMs.

Optionally, in an embodiment, the processor 820 is further configured to obtain a first co-channel self-interference cancellation capability signal-to-noise ratio $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM. The transmitter 840 is specifically configured to: send the indication information to the CMTS based on the first $SNR_{CM}$, the first relationship, the first $SNR_{CMTS}$, and a second relationship between an $SNR_{CMTS}$ and the receive power at which the CMTS receives the signal sent by the CM, where the indication information is used to instruct the CMTS to adjust the receive power at which the CMTS receives the signal sent by the second CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold.

Optionally, in an embodiment, the indication information carries a first target receive power at which the CMTS receives the signal sent by the second CM, and the indication information is specifically used to instruct the CMTS to adjust the receive power at which the CMTS receives the signal sent by the second CM to the first target receive power.

Optionally, in an embodiment, the first target transmit power is different from a target transmit power at which the CMTS sends a signal to another CM.

The network management system 800 can perform the steps in the method shown in FIG. 2. For brevity, details are not described herein again.

Figure 9:
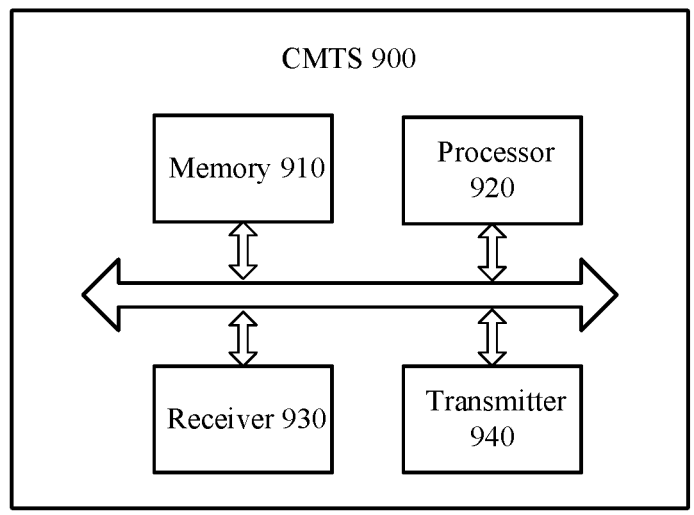
FIG. 9 is a schematic structural diagram of a CMTS according to an embodiment of the present invention.

FIG. 9 is a schematic structural diagram of a CMTS 900 according to an embodiment of the present invention. The CMTS 900 includes a memory 910, a processor 920, a receiver 930, and a transmitter 940.

The memory 910 is configured to store a program.

The processor 920 is configured to execute the program stored in the memory 910.

When the processor 920 executes the program stored in the memory 910, the processor 920 is specifically configured to invoke the receiver 930 to receive indication information sent by a network management system.

The processor 920 is specifically configured to adjust, based on the indication information, a receive power at which the CMTS receives a signal sent by a first CM, so that an $SNR_{CM}$ corresponding to the adjusted receive power is a target value of a co-channel mutual interference signal-to-noise ratio, where the $SNR_{CM}$ represents a signal ratio of a signal sent by the CMTS to a second CM and received by the second CM to a signal sent by the first CM to the CMTS and received by the second CM.

In this embodiment of the present invention, after receiving the indication information that instructs the CMTS to adjust a transmit power at which the CMTS sends the signal to the CM and that is sent by the network management system, the CMTS may adjust the transmit power based on the indication information, so that an $SNR_{CM}$ between the CMs when the CMTS sends the signal to the CM at the adjusted transmit power is greater than or equal to a co-channel mutual interference signal-to-noise ratio threshold. In other words, the CMTS can flexibly adjust the $SNR_{CM}$ between the CMs by adjusting the transmit power, so that the CMs can be flexibly grouped.

Optionally, in an embodiment, the processor 920 is specifically configured to adjust, based on the indication information, the receive power at which the CMTS receives the signal sent by the first cable modem CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold, where the $SNR_{CMTS}$ represents a signal ratio of the signal sent by the first CM and received by the CMTS to a signal that remains after self-interference cancellation is performed on the signal that is received by the CMTS and sent by the CMTS to the second CM.

Optionally, in an embodiment, the indication information carries a first target receive power at which the CMTS receives the signal sent by the first CM; and the processor 920 is specifically configured to adjust the receive power at which the CMTS receives the signal sent by the first CM to the first target receive power.

Optionally, in an embodiment, the first target transmit power is different from a target transmit power at which the CMTS sends a signal to another CM.

Figure 10:
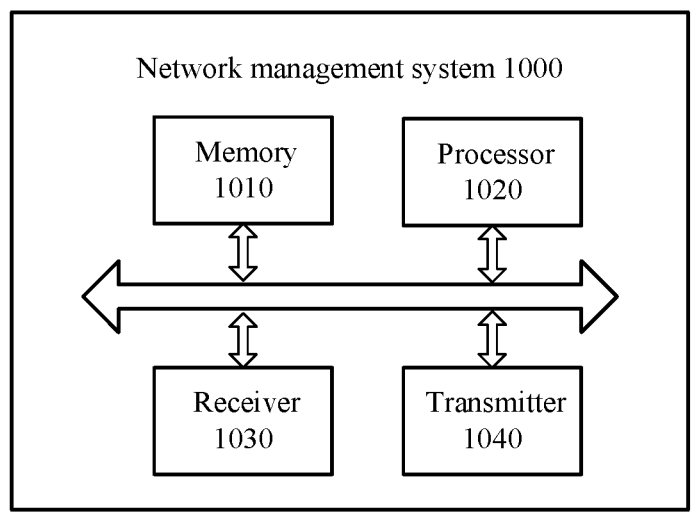
FIG. 10 is a schematic structural diagram of a network management system according to an embodiment of the present invention.

FIG. 10 is a schematic structural diagram of a network management system 1000 according to an embodiment of the present invention. The network management system 1000 includes a memory 1010, a processor 1020, a receiver 1030, and a transmitter 1040.

The memory 1010 is configured to store a program.

The processor 1020 is configured to execute the program stored in the memory 1010.

When the processor 1020 executes the program stored in the memory 1010, the processor 1020 is specifically configured to obtain a first $SNR_{CM}$ between CMs connected to a CMTS, where the first $SNR_{CM}$ represents a signal ratio of a signal sent by the CMTS to a first CM and received by the first CM to a signal sent by a second CM to the CMTS and received by the first CM.

The transmitter 1040 is configured to send indication information to the CMTS based on the first $SNR_{CM}$, and a first relationship between an $SNR_{CM}$ and a receive power at which the CMTS receives a signal sent by the CM, where the indication information is used to instruct the CMTS to adjust the receive power at which the CMTS receives the signal sent by the second CM, so that an $SNR_{CM}$ corresponding to the adjusted receive power is a target value of a co-channel mutual interference signal-to-noise ratio.

In this embodiment of the present invention, the network management system determines, based on the obtained co-channel mutual interference signal-to-noise ratio between the CMs, and a relationship between the co-channel mutual interference signal-to-noise ratio and the receive power at which the CMTS receives the signal sent by the CM, how the CMTS should adjust the receive power at which the CMTS receives the signal sent by the CM; and sends indication information to the CMTS, to instruct the CMTS to adjust the receive power at which the CMTS receives the signal sent by the CM, so that when the CMTS receives the signal sent by the CM at the adjusted receive power, the co-channel mutual interference signal-to-noise ratio between the CMs is greater than or equal to a preset co-channel mutual interference threshold, to flexibly adjust the co-channel mutual interference signal-to-noise ratio between the CMs by adjusting the receive power, and flexibly group the CMs.

Optionally, in an embodiment, the processor 1020 is further configured to obtain a first $SNR_{CMTS}$ of the CMTS, where the first $SNR_{CMTS}$ represents a signal ratio of a signal sent by the second CM and received by the CMTS to a signal that remains after self-interference cancellation is performed on a signal that is received by the CMTS and sent by the CMTS to the first CM. The transmitter 1040 is specifically configured to send the indication information to the CMTS based on the first $SNR_{CM}$, the first relationship, the first $SNR_{CMTS}$, and a second relationship between an $SNR_{CMTS}$ and the receive power at which the CMTS receives the signal sent by the CM, where the indication information is used to instruct the CMTS to adjust the receive power at which the CMTS receives the signal sent by the second CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold.

Optionally, in an embodiment, the indication information carries a first target receive power at which the CMTS receives the signal sent by the second CM, and the indication information is specifically used to instruct the CMTS to adjust the receive power at which the CMTS receives the signal sent by the second CM to the first target receive power.

Optionally, in an embodiment, the first target receive power is different from a target receive power at which the CMTS receives a signal sent by another CM.

Figure 11:
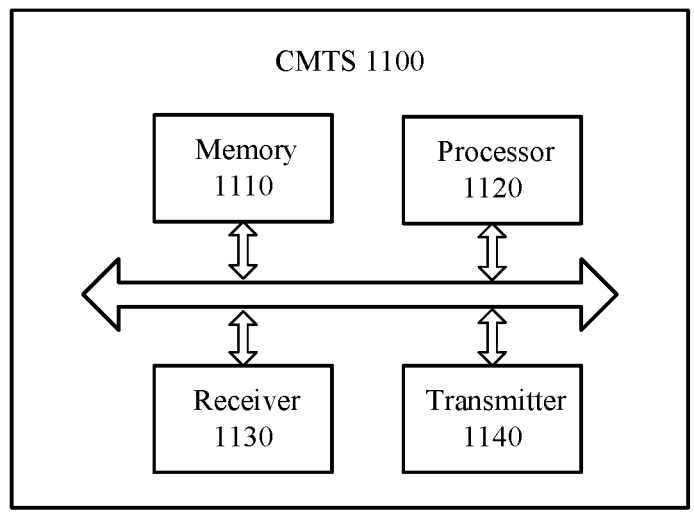
FIG. 11 is a schematic structural diagram of a CMTS according to an embodiment of the present invention.

FIG. 11 is a schematic structural diagram of a CMTS 1100 according to an embodiment of the present invention. The CMTS 1100 includes a memory 1110, a processor 1120, a receiver 1130, and a transmitter 1140.

The memory 1110 is configured to store a program.

The processor 1120 is configured to execute the program stored in the memory 1110.

When the processor 1120 executes the program stored in the memory 1110, the processor 1120 is configured to invoke the receiver 1110 to receive indication information sent by a network management system.

The processor 1120 is further configured to adjust, based on the indication information, a receive power at which the CMTS receives a signal sent by a first cable modem CM, so that an $SNR_{CM}$ corresponding to the adjusted receive power is a target value of a co-channel mutual interference signal-to-noise ratio, where the $SNR_{CM}$ represents a signal ratio of a signal sent by the CMTS to a second CM and received by the second CM to a signal sent by the first CM to the CMTS and received by the second CM.

In this embodiment of the present invention, after receiving indication information that instructs the CMTS to adjust the receive power at which the CMTS receives the signal sent by the CM and that is sent by the network management system, the CMTS may adjust the receive power based on the indication information, so that an $SNR_{CM}$ between the CMs when the CMTS receives the signal sent by the CM at the adjusted receive power is greater than or equal to a co-channel mutual interference signal-to-noise ratio threshold. In other words, the CMTS can flexibly adjust the $SNR_{CM}$ between the CMs by adjusting the receive power, so that the CMs can be flexibly grouped.

Optionally, in an embodiment, the processor 1120 is specifically configured to adjust, based on the indication information, the receive power at which the CMTS receives the signal sent by the first CM, so that the $SNR_{CM}$ corresponding to the adjusted receive power is the target value of the co-channel mutual interference signal-to-noise ratio, and an $SNR_{CMTS}$ corresponding to the adjusted receive power is greater than or equal to a co-channel self-interference cancellation capability signal-to-noise ratio threshold, where the $SNR_{CMTS}$ represents a signal ratio of the signal sent by the first CM and received by the CMTS to a signal that remains after self-interference cancellation is performed on the signal that is received by the CMTS and sent by the CMTS to the second CM.

Optionally, in an embodiment, the indication information carries a first target receive power at which the CMTS receives the signal sent by the first CM; and the adjusting, by the CMTS based on the indication information, the receive power at which the CMTS receives the signal sent by the first CM includes: adjusting, by the CMTS, the receive power at which the CMTS receives the signal sent by the first CM to the first target receive power.

Optionally, in an embodiment, the first target receive power is different from a target receive power at which the CMTS receives a signal sent by another CM.

Optionally, in an embodiment, the processor 1120 is further configured to determine, based on a first receive power and the first target receive power, an adjustment value of a transmit power at which the first CM sends the signal to the CMTS, where the first receive power is a receive power at which the CMTS actually receives the signal sent by the first CM. The transmitter 1140 is configured to send, to the first CM, a message carrying the adjustment value, so that the first CM adjusts, based on the adjustment value, the transmit power at which the first CM sends the signal to the CMTS.

Optionally, in an embodiment, the processor 1120 is specifically configured to subtract the first receive power from the first target receive power, to obtain the adjustment value.

Optionally, in an embodiment, the processor 1120 is further configured to determine, based on a second receive power, an average expected receive power, and a compensated receive power, an adjustment value of a transmit power at which the first CM sends the signal to the CMTS, where the second receive power is a receive power at which the CMTS actually receives the signal sent by the first CM, the average expected receive power is a same expected target receive power at which the CMTS receives signals sent by the first CM and the another CM, and the compensated receive power is a power needing to be compensated for adjusting the average expected receive power to the first target receive power. The transmitter 1140 is configured to send, to the first CM, a message carrying the adjustment value, so that the first CM adjusts, based on the adjustment value, the transmit power at which the first CM sends the signal to the CMTS.

Optionally, in an embodiment, the processor 1120 is specifically configured to perform calculation of: Average expected receive power−First receive power+Compensated receive power, to obtain the adjustment value.

Optionally, in an embodiment, the processor 1120 is specifically configured to perform calculation of: Average expected receive power−First receive power, to obtain the adjustment value.

Figure 12:
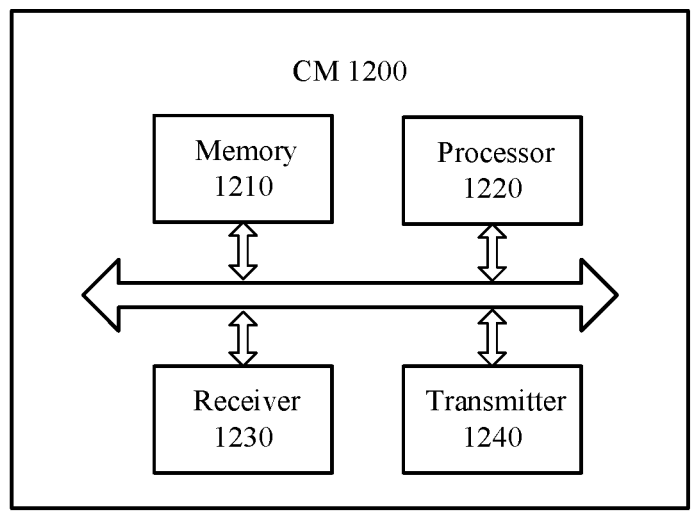
FIG. 12 is a schematic structural diagram of a CM according to an embodiment of the present invention.

FIG. 12 is a schematic structural diagram of a CM 1200 according to an embodiment of the present invention. The CM 1200 includes a memory 1210, a processor 1220, a receiver 1230, and a transmitter 1240.

The memory 1210 is configured to store a program.

The processor 1220 is configured to execute the program stored in the memory 1210.

When the processor 1220 executes the program stored in the memory 1210, the processor 1220 is configured to invoke the receiver 1230 to receive indication information sent by a CMTS.

The processor 1220 is further configured to adjust, based on the indication information, a transmit power at which the CM sends a signal to the CMTS, so that a receive power at which the CMTS receives the signal that is sent by the CM at the transmit power is a first target receive power, where the first target receive power is different from a target receive power at which the CMTS receives a signal sent by another CM.

In this embodiment of the present invention, when target receive powers at which the CMTS receives signals sent by different CMs are different, each CM may adjust, based on indication information the CMTS, a transmit power at which the CM sends the signal to the CMTS, so that when the CM sends the signal to the CMTS at the adjusted transmit power, a receive power of the CMTS is the target receive power.

Figure 13:
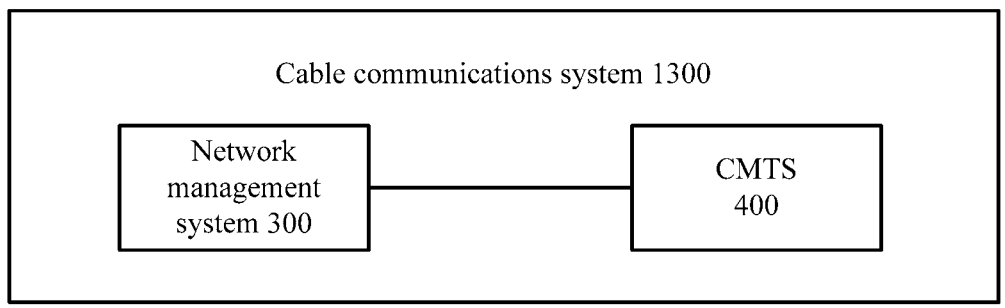
FIG. 13 is a schematic structural diagram of a cable communications system according to an embodiment of the present invention.

FIG. 13 is a schematic structural diagram of a cable communications system 1300 according to an embodiment of the present invention. It should be understood that, the communications system shown in FIG. 13 is merely an example, and the communications system in this embodiment of the present invention may further include another device or unit, or may include modules whose functions are similar to those of devices in FIG. 13, or may not include all devices in FIG. 13.

The cable communications system 1300 includes the network management system 300 shown in FIG. 3 and the CMTS 400 shown in FIG. 4. For brevity, details are not described herein again.

Figure 14:
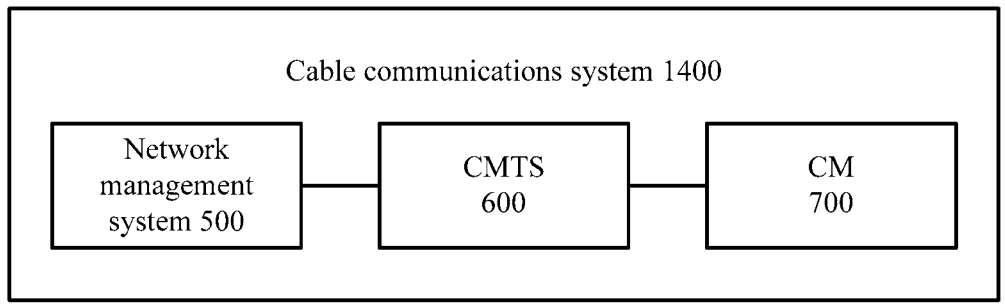
FIG. 14 is a schematic structural diagram of a cable communications system according to an embodiment of the present invention.

FIG. 14 is a schematic structural diagram of a cable communications system 1400 according to an embodiment of the present invention. It should be understood that, the communications system shown in FIG. 14 is merely an example, and the communications system in this embodiment of the present invention may further include another device or unit, or may include modules whose functions are similar to those of devices in FIG. 14, or may not include all devices in FIG. 14.

The cable communications system 1400 includes the network management system 500 shown in FIG. 5, the CMTS 600 shown in FIG. 6, and the CM 700 shown in FIG. 7. For brevity, details are not described herein again.

A person of ordinary skill in the art may be aware that, with reference to the examples described in the embodiments disclosed in the specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented electronically, mechanically, or in another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power adjustment method, comprising: obtaining, by a network management system, a first co-channel mutual interference signal-to-noise ratio (SNRcm) between two cable modems (CMs) connected to a cable modem termination system (CMTS), wherein the first SNRcm represents a signal ratio of a signal sent by the CMTS to a first CM and received by the first CM to a signal sent by a second CM to the CMTS and received by the second CM; and sending, by the network management system, indication information to the CMTS based on the first SNRcm, and a first relationship between an SNRcm and a transmit power at which the CMTS sends a signal to the CM, wherein the indication information is used to instruct the CMTS to adjust a transmit power at which the CMTS sends the signal to the first CM, so that an SNRcm corresponding to an adjusted transmit power results in a target value of a co-channel mutual interference signal-to-noise ratio between the two CMs; wherein the method further comprises: obtaining, by the network management system, a first co-channel self-interference cancellation capability signal-to-noise ratio (SNRcmts) of the CMTS, wherein the first SNRcmts represents a signal ratio of a signal sent by the second CM and received by the CMTS to a signal that remains after self-interference cancellation is performed on a signal that is received by the CMTS and sent by the CMTS to the first CM; and sending, by the network management system, the indication information to the CMTS based on the first SNRcmts, and a second relationship between an SNRcmts and the transmit power at which the CMTS sends the signal to the CM, wherein the indication information is used to instruct the CMTS to adjust the transmit power at which the CMTS sends the signal to the first CM, so that an SNRcmts corresponding to the adjusted transmit power is greater than or equal to a co-channel self-interference cancellation capability signal-to-noise ratio threshold.

2. The method according to claim 1, wherein the indication information carries a first target transmit power at which the CMTS sends the signal to the first CM, and the indication information is used to instruct the CMTS to adjust the transmit power at which the CMTS sends the signal to the first CM to the first target transmit power.

3. The method according to claim 2, wherein the first target transmit power is different from a target transmit power at which the CMTS sends a signal to another CM.

4. A power adjustment method, comprising: receiving, by a cable modem termination system (CMTS), indication information sent by a network management system; and adjusting, by the CMTS based on the indication information, a transmit power at which the CMTS sends a signal to a first cable modem (CM), so that an SNRcm corresponding to the adjusted transmit power is a target value of a co-channel mutual interference signal-to-noise ratio, wherein the SNRcm represents a signal ratio of a signal sent by the CMTS to the first CM and received by the first CM to a signal sent by a second CM to the CMTS and received by the first CM.

5. The method according to claim 4, wherein the adjusting step further comprises: adjusting, by the CMTS based on the indication information, the transmit power at which the CMTS sends the signal to the first CM, so that the SNRcm corresponding to the adjusted transmit power is the target value of the co-channel mutual interference signal-to-noise ratio, and an SNRcmts corresponding to the adjusted transmit power is greater than or equal to a co-channel self-interference cancellation capability signal-to-noise ratio threshold, wherein the SNRcmts represents a signal ratio of a signal sent by the second CM and received by the CMTS to a signal that remains after self-interference cancellation is performed on a signal that is received by the CMTS and sent by the CMTS to the first CM.

6. The method according to claim 4, wherein the indication information carries a first target transmit power at which the CMTS sends the signal to the first CM; and the adjusting, by the CMTS based on the indication information, the transmit power at which the CMTS sends the signal to the first CM comprises: adjusting, by the CMTS, the transmit power at which the CMTS sends the signal to the first CM to the first target transmit power.

7. The method according to claim 6, wherein the first target transmit power is different from a target transmit power at which the CMTS sends a signal to another CM.

8. A network management system, comprising: a receiver, a transmitter, a memory and a processor; the processor coupled to the memory, the receiver and the transmitter, wherein the memory includes instructions that when executed by the processor cause the system to perform the following: obtaining a first co-channel mutual interference signal-to-noise ratio (SNRcm) between two cable modems (CMs) connected to a cable modem termination system (CMTS), wherein the first SNRcm represents a signal ratio of a signal sent by the CMTS to a first CM and received by the first CM to a signal sent by a second CM to the CMTS and received by the first CM; and sending indication information to the CMTS based on the first SNRcm, and a first relationship between an SNRcm and a transmit power at which the CMTS sends a signal to the CM, wherein the indication information is used to instruct the CMTS to adjust a transmit power at which the CMTS sends the signal to the first CM, so that an SNRcm corresponding to an adjusted transmit power results in a target value of a co-channel mutual interference signal-to-noise ratio between the two CMs; wherein the network management system further performing: obtaining a first co-channel self-interference cancellation capability signal-to-noise ratio (SNRcmts) of the CMTS, wherein the first SNRcmts represents a signal ratio of a signal sent by the second CM and received by the CMTS to a signal that remains after self-interference cancellation is performed on a signal that is received by the CMTS and sent by the CMTS to the first CM; and sending the indication information to the CMTS based on the first SNRcm, the first relationship, the first SNRcmts, and a second relationship between an SNRcmts and the transmit power at which the CMTS sends the signal to the CM, wherein the indication information is used to instruct the CMTS to adjust the transmit power at which the CMTS sends the signal to the first CM, so that the SNRcm corresponding to the adjusted transmit power is the target value of the co-channel mutual interference signal-to-noise ratio between the two CMs, and an SNRcmts corresponding to the adjusted transmit power is greater than or equal to a co-channel self-interference cancellation capability signal-to-noise ratio threshold.

9. The network management system according to claim 8, wherein the indication information carries a first target transmit power at which the CMTS sends the signal to the first CM, and the indication information is used to instruct the CMTS to adjust the transmit power at which the CMTS sends the signal to the first CM to the first target transmit power.

10. A cable modem termination system (CMTS), comprising: a receiver, a transmitter, a memory and a processor; the processor coupled to the memory, the receiver and the transmitter, wherein the memory includes instructions that when executed by the processor cause the CMTS to perform the following: receiving indication information sent by a network management system; and adjusting, based on the indication information, a transmit power at which the CMTS sends a signal to a first cable modem (CM), so that an SNRcm corresponding to the adjusted transmit power is a target value of a co-channel mutual interference signal-to-noise ratio, wherein the SNRcm represents a signal ratio of a signal sent by the CMTS to the first CM and received by the first CM to a signal sent by a second CM to the CMTS and received by the first CM; wherein the CMTS further comprising: adjusting, based on the indication information, the transmit power at which the CMTS sends the signal to the first cable modem CM, so that the SNRcm corresponding to the adjusted transmit power is the target value of the co-channel mutual interference signal-to-noise ratio, and an SNRcmts corresponding to the adjusted transmit power is greater than or equal to a co-channel self-interference cancellation capability signal-to-noise ratio threshold, wherein the SNRcmts represents a signal ratio of a signal sent by the second CM and received by the CMTS to a signal that remains after self-interference cancellation is performed on a signal that is received by the CMTS and sent by the CMTS to the first CM.

11. The CMTS according to claim 10, wherein the indication information carries a first target transmit power at which the CMTS sends the signal to the first CM; and the instructions further comprise adjusting the transmit power at which the CMTS sends the signal to the first CM to the first target transmit power.

* * * * *